(12) United States Patent
Wu et al.

(10) Patent No.: US 11,111,054 B2
(45) Date of Patent: Sep. 7, 2021

(54) EQUAL-FORK PALLET

(71) Applicant: Hangzhou Penno Packtech Co., LTD, Zhejiang (CN)

(72) Inventors: Qiaoli Wu, Zhejiang (CN); Jianwei Peng, Zhejiang (CN); Huizhen Jiang, Zhejiang (CN)

(73) Assignee: HANGZHOU PENNO PACKTECH CO., LTD., Hangzhou (CN)

( * ) Notice: Subject to any disclaimer, the term of this patent is extended or adjusted under 35 U.S.C. 154(b) by 0 days.

(21) Appl. No.: 16/142,596

(22) Filed: Sep. 26, 2018

(65) Prior Publication Data

US 2019/0092523 A1   Mar. 28, 2019

(30) Foreign Application Priority Data

Sep. 27, 2017  (CN) .......................... 201721248397.1
Aug. 17, 2018  (CN) .......................... 201810939367.8

(51) Int. Cl.
  *B65D 19/38*   (2006.01)
  *B65D 19/00*   (2006.01)
  *B27N 5/00*    (2006.01)

(52) U.S. Cl.
  CPC ............... *B65D 19/38* (2013.01); *B27N 5/00* (2013.01); *B65D 19/004* (2013.01);
  (Continued)

(58) Field of Classification Search
  CPC .......... B65D 2519/00034; B65D 2519/00069; B65D 2519/00104; B65D 2519/00139;
  (Continued)

(56) References Cited

U.S. PATENT DOCUMENTS 3,140,672 A *  7/1964  De Luca ............ B65D 19/0018
                                              108/53.3
3,424,110 A *  1/1969  Toot ..................... B65D 19/004
                                              108/53.3
(Continued)

FOREIGN PATENT DOCUMENTS

DE         2510547 A1 *  9/1976  ......... B65D 19/0036

OTHER PUBLICATIONS

English Translation of Munk (DE2510547) (Year: 2020).*

*Primary Examiner* — Matthew W Ing
(74) *Attorney, Agent, or Firm* — NZ Carr Law Office

(57) ABSTRACT

An equal-fork pallet comprising a pallet body is provided. The pallet body is provided with a stand structure and a reinforcing structure, the reinforcing structure is a reinforcing rib embodied by a groove structure pressed on the surface of the pallet body, and the reinforcing rib comprises a connection type reinforcing rib and a semi-partition type reinforcing rib, the stand structure comprises a corner stand, an edge stand and a center stand, and neither end of the partition type reinforcing rib is connected to the stand. The equal-fork pallet has a reasonable structural design and strong pressure bearing capacity, with targeted layout and design of the reinforcing rib centralized position and stress concentration position such as stand. The pallet can overcome the problems of low local compressive strength and proneness to produce stress fracture and local cracking.

7 Claims, 13 Drawing Sheets

(52) U.S. Cl.
CPC .............. *B65D 2519/00034* (2013.01); *B65D 2519/00069* (2013.01); *B65D 2519/0094* (2013.01); *B65D 2519/00139* (2013.01); *B65D 2519/00268* (2013.01); *B65D 2519/00402* (2013.01); *B65D 2519/00407* (2013.01); *B65D 2519/00462* (2013.01)

(58) Field of Classification Search
CPC .. B65D 2519/0094; B65D 2519/00402; B65D 2519/00407; B65D 19/38; B65D 19/004; B65D 2519/00268; B65D 2519/00462; B27N 5/00
USPC ............................................ 108/57.25, 57.28
See application file for complete search history.

(56) References Cited

U.S. PATENT DOCUMENTS

| | | | | |
|---|---|---|---|---|
| 3,467,032 | A * | 9/1969 | Charterton | B65D 19/0034 108/57.26 |
| 3,526,195 | A * | 9/1970 | Maryonovich | B65D 19/004 108/53.1 |
| 3,640,229 | A * | 2/1972 | Bell | B65D 19/0018 108/57.28 |
| 3,699,901 | A * | 10/1972 | Cook, III | B65D 19/004 108/57.25 |
| 3,707,127 | A * | 12/1972 | Palfey | B65D 19/004 108/53.3 |
| 4,240,360 | A * | 12/1980 | Sanders | B65D 19/0028 108/53.3 |
| 4,674,414 | A * | 6/1987 | Nulle | B65D 19/004 108/53.3 |
| 5,168,817 | A * | 12/1992 | Nulle | B65D 19/004 108/57.29 |
| 2004/0134390 | A1* | 7/2004 | Apps | B65D 19/0018 108/53.1 |
| 2007/0056483 | A1* | 3/2007 | Garcia | B65D 19/0051 108/57.25 |

* cited by examiner

EQUAL-FORK PALLET

CROSS-REFERENCES TO RELATED APPLICATIONS

This application claims priority to Chinese Patent Application No. 201721248397.1 filed on Sep. 27, 2017 and Chinese Patent Application No. 201810939367.8 filed on Aug. 17, 2018, the contents of which are incorporated herein by reference in their entireties.

FIELD OF THE INVENTION

The present invention relates to an equal-fork pallet.

BACKGROUND

A pallet is a carrier for stacking goods and a tool for mechanized loading and unloading and handling. The pallets can be used to collect the scattered small cargos and containers. It can be composed as a transportation system of an assembly unit with the forklift in a unit form. Therefore, the pallet has become an indispensable important tool for the modern logistics system and widely used in countries all over the world.

In 1971, Werzalit Company invented a patented technology for adding wood fiber materials and wood shavings mixed with thermosetting resins to manufacture particleboard. In 1979, Litco established the first presswood pallet plant using this technology.

The molded pallet is a plant fiber molded flat industrial pallet. Usually the raw material of pallet is wood shaving and plant straw, etc. It is an overall structure, and the panel and nine support legs are molded at one time. The upper surface of the pallet plate is flat and smooth that can meet the transportation of various cargos, and the lower surface is provided with a reinforcing rib.

Molded industrial pallets are an important type of shaving molded products. They are mainly used for handling and storing goods in docks, freight yards, warehouses, workshops, shopping malls, etc. It forms a mobile unit or handling unit with goods, and it is used together with forklifts, trucks, cranes, etc. Generally, the specifications of industrial pallets include 400 mm~600 mm, 600 mm~800 mm, 800 mm~1000 mm, 1000 mm~1200 mm, 1100 mm~1100 mm. The dynamic load capacity is from 250 kg to 1500 kg, the dead weight of pallet is 10 kg~20 kg. With the arcuate edge, trough beam and the ingenious perfect reinforcing rib, the loading factor of the pallet can be as high as 80 (dynamic load). The shaving-molded industrial pallets are heteromorphic thin-shell members of equal strength, with light dead weight and high strength. Its ratio of load carrying capacity to dead weight (load capacity) is as high as 60~80 (dynamic load) and 200~300 (static load).

Since the molded pallet is made of straw, twigs, sawdust that is recyclable, the production process usually adopts hot pressing, etc. The raw materials and processes are environmentally friendly. Therefore, the pallets are increasingly occupying the major markets. There are more and more studies on the molded pallets, focusing on such topics as how to make better use of environmentally friendly raw materials, how to improve the load and strength of pallets, etc.

Compared with traditional plastic pallets, molded pallets have the advantages of environmentally friendly materials, streamlined manufacturing process, low manufacturing cost, low environmental pollution during manufacturing process, and few post-manufacturing processes, etc. The molded pallets are made of smashed waste materials, and the material has a large density after compaction. Compared with plastic pallets, its compressive strength is high and the wear resistance is excellent, so the molded pallets are more widely used.

Compared with traditional wooden pallets, molded pallets have many advantages in the materials. The materials of molded pallets are usually scraps such as sawdust or crop waste, such as straw, etc. Compared with wooden pallets that require logging, the molded pallets not only reduce the costs, but also meet the requirements of energy saving and environmental protection and protection of non-renewable resources. In addition, the strength and durability of wood materials are affected by the humidity and temperature in the environment during storage, and in case of high humidity, wood materials are prone to mildew, so the performance is dramatically decreased, and its useful life is very limited. In contrast, pallets made by industrial molding process are less affected by the environment due to great density, and its stability of performance maintenance is greatly improved in different environments. Moreover, the strength of the wooden pallet is greatly affected by the raw material, and the pallets prepared from different wooden materials have varied performance. In addition, after cut and formed, the wood material has a high surface roughness, and its corners and even the surface may have many burrs. If it is necessary to polish the surface of the wooden pallet, the production cost and production cycle will be greatly increased, but if it is not polished, its applications will be less, for example, only objects that are wear-resistant or have a rough surface may be placed, but not applicable to the parts that need protection.

Therefore, molded pallets are increasing year by year on the pallet markets. With the continuous improvement of the production technology of molded pallets, the molded pallets are used more frequently in recent years, while the uses of conventional pallets are decreasing dramatically, thus, it is necessary to provide a lightweight pallet that has strong load-bearing capacity, is easy to take and convenient to use.

SUMMARY

The technical problem to be solved in the invention is to provide an equal-fork pallet that has reasonable structural design and strong loading bearing capacity. It can provide a targeted layout and design for the reinforcing rib gathering position and the stress-centering location such as stand, overcome the problems of low compressive strength of the pallet, proneness to produce stress fracture and local cracking, etc. In addition, the pallet is suitable for insertion from different directions of the forklift, making convenient for use. The forklifts can insert the bottom of the pallet from four directions.

To achieve this object, the present invention provides the following technical solutions.

An equal-fork pallet, comprising a pallet body, wherein the pallet body is provided with a stand structure and a reinforcing structure, the reinforcing structure is a reinforcing rib embodied by a groove structure pressed on the surface of the pallet body, and the reinforcing rib comprises a connection type reinforcing rib and a semi-partition type reinforcing rib, the stand structure comprises a corner stand, an edge stand and a center stand, the corner stand is disposed at the four corners of the equal-fork pallet, the edge stand is disposed at the middle of the edge of the equal-fork pallet, the center stand is disposed at the center of the equal-fork pallet; the corner stand, edge stand and center stand have the same height, so that all stand bottoms of the pallet are on the same plane when the pallet is laid flatwise and the distance between each edge stand and the adjacent corner stand is the same.

Further, the equal-fork pallet comprises a partition type reinforcing rib, wherein neither end of the partition type reinforcing rib is connected to the stand.

Further, a notch is provided on the transverse connection type reinforcing rib of the pallet edge.

Further, the pallet body is quadrangle as a whole, and the outer edges of the four corners of the quadrangle are inverted into an arc.

Further, both ends of the connection type reinforcing rib are connected to the stand, and the connection type reinforcing rib is respectively disposed between the corner stand and the center stand and between the edge stands of adjacent sides.

Further, the semi-partition type reinforcing rib is disposed between the edge stand and the center stand, one end of the semi-partition type reinforcing rib is connected to the side of the center stand, and the other end is extended to the position close to the side of the edge stand.

Further, a connection type reinforcing rib is provided between the edge stand and the adjacent corner stand, the connection type reinforcing rib connects the four edges of the pallet into a large square, and the semi-partition type reinforcing rib divides the pallet body into four small squares.

Further, the connection type reinforcing rib between the corner stand and the center stand and the connection type reinforcing rib between the edge stands on the adjacent sides cross reciprocally to form four cross-shaped reinforcing rib groups that are located in four square regions separated by a semi-partition type reinforcing rib respectively.

Further, the connecting lines between the diagonal corner stand and the center stand are on the same straight line, forming a large cross-shaped reinforcing rib group integrally; the cross-shaped reinforcing rib group in the smaller square divides the small square region into four small triangular areas, and the edges of two small triangular areas are closed by a connection type reinforcing rib located between the edge stand and the corner stand on the side of the pallet to form a closed small triangular area, and the other two small triangular areas form a non-closed small triangular area by taking a semi-partition type reinforcing rib as a triangular hypotenuse.

Further, the partition type reinforcing rib reinforcing rib is an arcuate reinforcing rib that is located in the closed small triangular area and both ends thereof face toward both ends of the hypotenuse of the closed small triangular area.

Further, the bottom plates of the center stand and the four corner stands are quadrangle; and the bottom plate of the edge stand is rectangular.

Further, the outer surface of the stand bottom plate is planar, both sides of the inner surface are inclined toward the middle and a lowest portion is formed in the middle.

Further, the lowest portion is a U-shaped groove.

Further, the width of the bottom of the U-shaped groove is not more than ½ of the width of the bottom of the pallet.

Further, the direction of the groove is the same as the direction of one of the sides of the pallet, or the direction of the groove has an angle from the direction of one side of the pallet, such as 15°, 30°, 45° or 60°, or other, and the angle can be adjusted according to the depth of stand and the angle of inclination of the stand sidewall.

Further, the stand comprises a stand sidewall and a stand bottom plate; the stand sidewalls tilt inwardly so that all stands form a big top and small bottom shape.

Further, the outer surface of the stand sidewall is provided with a step surface; the step surface comprises a longitudinal surface and a lateral surface, the longitudinal surface being arranged along the height of the pallet body, and the lateral surface being connected to two adjacent longitudinal surfaces, or connected to a longitudinal surface and a stand sidewall, and though the continuous connection way of longitudinal surface+lateral surface+longitudinal surface or longitudinal surface+lateral surface+stand sidewall+longitudinal surface, a continuous step surface is formed on the outer surface of the stand sidewall.

Further, a reinforcing rib is provided on one of the side walls or sides of the corner stand and the edge stand, and the reinforcing rib extends downward from the opening of the stand to the middle position of the stand, the reinforcing rib forms an inward concave portion on the inner surface of the stand sidewall, and forms an outward convex portion on the outer surface of the stand sidewall.

Further, the outer wall of the reinforcing rib has a corner and the outer portion of the corner forms an excessive arc surface.

In a first aspect, the present invention provides an equal-fork pallet comprising a pallet body. The pallet body is provided with a stand structure and a reinforcing structure. The stand structure and the reinforcing structure are both protruded from the lower surface of the pallet body, and the stand structure forms a supporting structure of the pallet body. The pallet body can be overhead by the supporting structure so that there is a spacing between the lower surface of the pallet body and the underlying object. If there is no stand structure, the lower surface of the pallet body will directly contact the placement plane, or directly contact the object of the next layer and/or the upper surface of the pallet, which will produce large-area friction during the process of forking and stacking, etc. As the pallet usually carries objects of large weight, it is unfavorable for operation and causes a great degree of wear on the contact surface of the pallet if the friction area is increased, greatly shortening the life of the pallet. In addition, without the overhead of the supporting structure, the contact surface of the pallet may be close together due to heavy load. When the state is maintained for a long time, the gas between the two contact surfaces may be completely emptied, or even two surfaces merge together, which is difficult to separate. Therefore, some overhead structures need to be disposed on the pallet body.

In some preferred embodiments, the overhead structure can meet the requirements. When different pallets of the same specification are stacked together, a part of the surface may contact each other between the overhead structures of the adjacent pallets of the upper and lower layers, and another part of surface may not contact each other, for example, when the pallet is stacked together, the stand of the upper pallet can be inserted into the stand of the lower pallet, but only a part of it can be inserted, for example, ⅓, so that a gap can be left inside the stand structure, without complete fitting, or a gap may exist between the upper and lower pallets, to prevent the surface from being excessively fitted or tightly attached for a long time when the pallet is stored.

In some preferred embodiments, the stand structure comprises a corner stand, an edge stand, and a center stand. The four corners of the quadrangle are respectively provided with four corner stands, and the four sides of the quadrangle are respectively provided with edge stands, the edge stand is located in the middle of the two adjacent corner stands. In the center of the quadrangle pallet body, a center stand is provided, to form a relatively stable nine-stand structure. Usually, regardless of corner stand, edge stand or center stand, they have the same height, that is, when the pallet is placed flatwise, all the stand bottoms can be placed on the same plane.

In some preferred embodiments, the pallet body is quadrangle as a whole, and the four sides of the quadrangle are all equal in length, so that the pallet can be placed in any direction (left and right or front and rear directions), which makes the pallet of the present invention different from the pallet of non-quadrangle structure. The ratio of length and width of some pallets may be adjusted, for some pallets of different length and width, usually it is only possible to fork from the long side or short side. For example, in one loading, the fork is uniformly crossed from the long side. There is requirement for the stacking direction of the pallet itself, for pallets with different lengths and widths, the distance for forking is different, and if it is forked from the short side, it may be impossible to meet the width requirement of the fork because the short side is short. If the forking width of the short side is met, then the forking width does not match the forking width of the long side, and it is easy to cause the actual forking width of the long side to be less than that of the long-side pallet, resulting in instability of long side when forking. In addition, if it is made to round shape, the round has no lateral sides, and it is difficult to find the forking direction; in addition, the edges of circular pallet are arc, which do not match the direction of the fork mechanism such as a forklift, increase the forking distance; in addition, the increased distance is not an effective distance, which is not conducive to forking. Therefore, it is appropriate to set the pallet body as a quadrangle.

In some preferred embodiments, the distance between each edge stand and the adjacent corner stand is the same, because the pallet itself is quadrangle and the lengths of the four sides are basically the same. The location between the edge stand and the corner stand is the forking location. If the distance between the edge stand and the corner stand on each side is the same, the effect is the same regardless of the forking distance. It can meet the forking from four directions of the pallet, without producing the problem of forking from different angles for the same forklift or fork lever due to different forking distance from different direction.

In some preferred embodiments, the outer edges of the four corners of the quadrangle are inverted into an arc shape which is conducive to forming; and the four corners are arranged in an arc shape, which reduces the wear and cutting of the surrounding objects and environment by the pallet itself If the four corners of the pallet are sharp parts, it is very likely to hook to other items in addition to wear. The setting of arc shape can eliminate this phenomenon.

In some preferred embodiments, the pallet body is divided into four square regions and eight isosceles right triangle regions. A center stand is disposed at the center of the four square regions after combination. The center stand, the corner stand, and the edge stand adopt pyramid structures. A connection type reinforcing rib that is in an inverted "convex" straight structure is disposed between the corner stand and the edge stand.

In a second aspect, the present invention provides a reinforcing structure on an equal-fork pallet. The reinforcing structure is mainly arranged on the surface of the pallet body. The reinforcing structure is mainly represented by a reinforcing rib, which is a groove structure suppressed on the surface of the pallet body. The reinforcing rib comprises a connection type reinforcing rib, a partition type reinforcing rib and a semi-partition type reinforcing rib, which is mainly distinguished from the connection between the reinforcing rib and the stand. The reinforcing rib whose both ends are connected to the stand is called connection type reinforcing rib, and the reinforcing rib that is not connected to the stand (or other structure on the pallet) is called a partition type reinforcing rib, and the reinforcing rib whose one end is connected to the stand and the other end is not connected to the stand is called semi-partition type reinforcing rib. After analyzing the force of whole pallet and combining with the arrangement of the stand structure, it is preferred to arrange the three types of reinforcing ribs on one pallet simultaneously. The pressure bearing capacity is adjusted by the reinforcing rib caused by the structure and height between the pallet body and the stand structure.

In some preferred embodiments, it is possible to arrange the connection type reinforcing rib and the semi-partition type reinforcing rib only.

In some preferred embodiments, a semi-partition type reinforcing rib is provided between the edge stand and the center stand, and one end of the semi-partition type reinforcing rib is connected to the edge stand, and the other end extends to a position close to the edge of the center stand. In some preferred embodiments, one end of the semi-partition type reinforcing rib is connected to the side of the center stand, and the other end extends to a position close to the side of the edge stand. The semi-partition type reinforcing rib is mainly used when there are excessive connections between a stand and a reinforcing rib and it is required to arrange reinforcing ribs due to great area of the pallet between the stand and other stand. For example, as shown in the figure, the center stand has already connected four reinforcing ribs. If the reinforcing rib is connected in the remaining position, the opening of the entire center stand may be occupied by the reinforcing rib. In this case, the center stand and the reinforcing rib are disconnected, and the reinforcing rib is extended to the vicinity of the center stand, without affecting the reinforcing effect of the reinforcing rib, in addition, the connection between the center stand and the reinforcing rib is arranged reasonably. In some preferred embodiments, the pallet body is divided into four small square parts by these semi-partition type reinforcing ribs.

In some preferred embodiments, a connection type reinforcing rib is provided between the corner stand and the center stand and the edge stand on the adjacent side. The connection type reinforcing ribs of the part are intercrossed to form four cross-shaped reinforcing rib groups, which are located on four parts separated by the semi-partition type reinforcing rib. In addition, the lines between the diagonal corner stand and the center stand are on the same line, so that a large cross-shaped reinforcing rib group is formed integrally. The large cross-shaped reinforcing rib group divides the entire pallet body into four triangular parts. The cross shape is a relatively stable form, and through the combination of an overall large cross and four small crosses, the whole pallet body is supported by the reinforcing structure.

In some preferred embodiments, connection type reinforcing ribs are provided between the edge stand and the adjacent corner stand. The connection type reinforcing ribs connect four edges of the pallet as a square, and the square causes all the four corners on the edge of the pallet body to be linked into a whole, and the body between stands is reinforced and supported.

In some preferred embodiments, the cross-shaped structure in the small square divides the small square area into four small triangular areas, wherein the edges of the two small triangular areas are closed by two the connection type reinforcing rib located between the edge stand and the corner stand on the side of the pallet, to form a closed small triangular area, while the other two small triangular areas form a non-closed small triangular area by taking the semi-partition type reinforcing rib as a triangular hypotenuse. Relatively speaking, the non-closed small triangular area is closer to the center of the pallet. The center has a large bearing area and the pressure can be evenly distributed, and there is only one center stand in the center, with relatively uniform structure and relatively stable strength. However, the closed small triangular area is close to the edge of the pallet where the stress is easy to concentrate and the stands are densely distributed, especially the position close to the corner, therefore, an additional reinforcing structure is required to make the bearing ability of the whole pallet to be basically the same. Therefore, in some preferred embodiments, a partition type reinforcing rib is arranged in the closed small triangular area, and the partition type reinforcing rib corresponds to the closed small triangular area one by one. The main role of the partition type reinforcing rib is to strengthen the strength of the pallet edge and the corner, especially the strength of the closed small triangular area. In some preferred embodiments, the partition type reinforcing rib is an arcuate reinforcing rib, and both ends of which face toward both ends of the hypotenuse of the closed small triangular area, that is, to close the both ends of the connection type reinforcing rib located on the edge of the closed small triangular area. In prior art, similar arcuate reinforcing rib is arranged. For example, in the background art, an arcuate reinforcing rib is also provided in the equidistant forked pallet, but the arcuate reinforcing rib is usually connected to the stand. Actually, most pallets including the arcuate reinforcing rib in the prior art are connected to the stand. On the one hand, it is a conventional design method, and on the other hand, if an area that is completely separated from other areas for the equal-fork pallet, it will increase the difficulty of molding process and the mold opening process, because the molding materials in the separate area cannot be balanced with other areas. However, the technical solutions of the present invention do not have such difficulty, because the thickness of the reinforcing rib provided in the present invention is consistent with the thickness of the pallet itself, which can be achieved by adjusting the sizes of the upper and lower molds according to the shape. In the present invention, the section of the arcuate reinforcing rib is a "big top and small bottom" structure, and both ends of the arcuate reinforcing rib have excessive fillets, without affecting the mold opening. Moreover, if the connection type reinforcing rib is also used in the closed small triangular area, that is, the reinforcing rib itself is connected to the corner stand, the opening of the corner stand on the side toward the pallet will be completely occupied by the connection of the reinforcing rib. It is found in experiments and actual uses that such a reinforcing structure will cause stress concentration in the stand part, and the joint between the stand and the reinforcing rib is prone to brittle fracture, which will reduce the overall strength of the pallet by around 10%. Therefore, the closed small triangular area is strengthened by partition type reinforcing ribs. In some preferred embodiments, the distance between the ends of the partition type reinforcing rib and the edge of the upper end of the stand is not greater than the width of the reinforcing rib itself. Since the reinforcing rib still needs to be distributed on the surface of the pallet body as much as possible, the ends of the reinforcing rib must be close to the stand, and if the reinforcing rib cannot pass through, it will not strengthen a certain area.

The foregoing-stated size is relative, for example, for a triangle, two diagonal connection types reinforcing rib divide the entire pallet into a triangle, which is larger than the area of the triangle of a part of pallet divided by connection type reinforcing rib between the corner stand and the center stand and the adjacent edge stand, therefore, the former is called a large triangle or a larger triangle, and the latter is called a small triangle or a smaller triangle, that is, the latter is a part of the former. For a square, the square of the entire pallet separated by the connection type reinforcing rib of the edge is larger than the area of the four squares separated by the semi-partition type reinforcing rib. Therefore, the former is called a big square or a bigger square, and the latter is called a small square or a smaller square, that is, the latter is a part of the former.

In some preferred embodiments, a notch is provided on the transverse connection type reinforcing rib located on the pallet edge, and the notch can be conducive to mold lifting, or can be used as a clamping portion during the handling of the pallet itself.

In a third aspect, the present invention provides a stand structure of an equal-fork pallet.

The stand structure comprises a corner stand, an edge stand and a center stand. The four corners of the quadrangle are respectively provided with four corner stands, and the four sides of the quadrangle are respectively provided with edge stands. The edge stands are located in the middle of the two adjacent corner stands. In the center of the quadrangle pallet body, a center stand is provided, to form a relatively stable nine-stand structure. Usually, regardless of corner stand, edge stand or center stand, they have the same height, that is, when the pallet is placed flatwise, all the stand bottoms can be placed on the same plane.

In some preferred embodiments, the overall shape of the center stand is also a quadrangle, the quadrangle herein is the shape of the bottom plate of the center stand. In some preferred embodiments, the bottom plate of the corner stand has the same size and shape as that of the center stand. In some preferred embodiments, the bottom plate of the edge stand is rectangular, and the rectangular side with the same direction of the side of the rectangle is the long side, and the other two sides are short sides. In some preferred embodiments, the four corners of the foregoing quadrangle and rectangle are rounded. The edge stand is set to a rectangle because the position between the edge stand and the corner stand is the fork position, and the width of the fork position must match with the fork component of the fork mechanism. As the corner stand cannot change in length, if the corner stand is increased wholly, it may affect the strength of the stand or even the entire pallet, while the length of the edge stand (ie, the length along the side) can be adjusted appropriately to regulate the spacing between the corner stand and the edge stand; moreover, by adjusting the distance between the corner stand and the edge stand through extending or increasing from the edge stand to the corner stand on both sides, the fork distance of the pallet itself can meet the fork requirements.

In some preferred embodiments, since the cross section of the edge stand in the middle of each side is rectangular, the square of the long side of rectangle is aligned with the edge of the pallet, while the section of the center stand is square, so the width of the center stand is smaller than the width of the edge stand in the direction of the fork, and the center stand will not block the forking.

In some preferred embodiments, since the cross section of the edge stand located in the middle of each side is rectangular, the square of the short side of rectangle is perpendicular to the edge direction of the pallet, and the short side length of the rectangle is the same as the width of the corner stand, so that the width of the long side of the edge stand will not affect the forking of another square.

In some embodiments, the stand sidewall tilts inwardly, so that the stand forms a "big top and small bottom" shape. For the same specification of pallet, the size of the outermost end of the stand is obviously smaller than the size of the pallet opening, the upper stand can be inserted into the lower stand, but because the pallet has a thick wall and the stand has a large mouth, the stand of the upper pallet can only be partially inserted into the stand of the lower pallet, without complete fitting.

In some preferred embodiment, the stand comprises a stand sidewall and a stand bottom plate.

In some preferred embodiments, the inner surface and the outer surface of the stand bottom plate are both planes. In some preferred embodiments, the outer surface of the stand bottom plate is a plane, and the inner surface has a certain slope. In some preferred embodiments, the outer surface of the stand bottom plate is a plane and both sides of the inner surface are inclined toward the middle portion, to form a lowest portion in the middle portion. In some preferred embodiments, the lowest portion is a V-shaped groove. In some preferred embodiments, the lowest portion is a U-shaped groove. U-shaped groove is wider at the bottom of the groove than that of the V-shaped groove. U-shaped groove can be used when the width of the pallet is large. When the pallet has a big width, relatively speaking, the stand will be greater correspondingly. When the thickness of the pallet does not change much, if the V-shaped groove is still used, it is possible that the stand sidewalls at both sides of the stand bottom groove is thick, and if the difference of thickness between the stand sidewall bottom and other parts is too large, it is not conducive to the uniform force of the stand. Therefore, U-shaped groove is used when the side length of the pallet exceeds 900 mm or the maximum width of the stand in the direction of the width of the V-shaped groove exceeds 60 mm. In some preferred embodiments, the width of the bottom of the U-shaped groove does not exceed ½ of the width of the bottom of the pallet, and the U-shaped groove should not be too wide, otherwise, the strength of joint between the stand bottom plate and the stand bottom plate and the stand sidewall will be affected. In some preferred embodiments, the direction of the groove is the same as the direction of one of the sides of the pallet. In some preferred embodiments, the groove and one of the sides of the pallet form an angle, for example, 15°, 30°, 45° or 60°, or other, and the angle can be adjusted according to the depth of stand and the angle of inclination of the stand sidewall. In some preferred embodiments, when the angle of inclination of the stand sidewall exceeds 30°, the inclination of the groove can be appropriately adjusted, because the larger the angle of inclination of the pallet sidewall, the larger the lateral stress and shear stress exerted on the pallet sidewall. When the inner surface of the stand bottom plate is a groove, the inner surface of the stand sidewall must have a slope matching the sides of the groove. At this time, the force exerted on the inner surface of the stand will be completely distributed on the slope. As a result, the force of the stand sidewall is concentrated on both sides of the slope, and the force exerted on another both sides is small or none, causing uneven force on the stand. If the groove direction of the inner surface of the stand bottom plate is appropriately changed, the slope will be distorted along the direction of the groove. In this case, the stand sidewall will bear the lateral component force, then the force exerted on the stand is relatively uniform, and the local force will not be excessive. In some preferred embodiments, the directions of the grooves in different stands on the same arrangement may be different, so that the divergence of the force distribution is better, to avoid the stress concentration. For example, the groove direction of the corner stand can be consistent with the oblique direction of the four corners, and the groove direction of the side edge stand can be opposite, so that the stress is evenly distributed in all directions.

In some preferred embodiments, the thickness of the stand bottom plate is consistent with the thickness of the pallet body. The thickness of the stand bottom plate should be the minimum thickness of the stand bottom plate, that is, the thickness of the remaining stand bottom plate after excluding the thickness of the groove. In some preferred embodiments, the thickness of the stand bottom plate is not less than the thickness of the pallet body. The stand bottom plate is the concentrated position that bears the stress and pressure of the whole pallet. Therefore, the thickness of the stand bottom plate must be guaranteed to ensure the overall support strength of the pallet. In some preferred embodiments, the thickness of the connection between the stand bottom plate and the stand sidewall is greater than the thickness of the stand bottom plate, the connection between the stand bottom plate and the stand sidewall is usually a stress concentration point due to the bending of the structure. Therefore, a larger thickness is required to ensure strength. In some preferred embodiments, the inner wall of the connection between the stand bottom plate and the stand sidewall is a smooth excessive arc surface which can partially offset the stress concentration at the bending portion.

In some preferred embodiments, the step surface is provided on the outer surface of the stand sidewall. Since the pallets are stacked together, the stand of the upper pallet is inserted into the stand of the lower pallet. Therefore, by setting the step surface, the contact of the upper and lower layers can be reduced, and thereby reducing the contact friction when the upper and lower pallets are stacked, and further, the continuous step surface forms an uneven shape on the outer surface of the stand sidewall, and the uneven shape has a peak shape and a valley shape, and the valley shape is inwardly recessed, the recessed valley shape can form a ventilation gap between the pallets, so that even if the number of stacks is large and the weight is large, the gap between the upper and lower pallets will not become small or even disappear due to the extrusion, to make the contact surface close together and difficult to separate. In some preferred embodiments, the outer edge of the step surface is processed into a smooth arc surface so as not to cause great wear on the inner wall of the lower pallet during stacking.

In some preferred embodiments, the thickness of the stand sidewall is the same as the thickness of the palette body. In some preferred embodiments, the thickness of the stand sidewall is less than the thickness of the palette body. In some preferred embodiments, the step surface is disposed to protrude from the original thickness of the stand sidewall. In some preferred embodiments, the overall thickness of the step surface and the stand sidewall is not less than the thickness of the pallet body, and the step surface can increase the thickness of the stand sidewall to some extent, therefore, the thickness of the stand sidewall excluding the step surface can be appropriately reduced.

In some preferred embodiments, the step surface comprises a longitudinal surface and a lateral surface, the longitudinal surface being arranged along the height of the pallet body, and the lateral surface being connected to two adjacent longitudinal surfaces, or connected to a longitudinal surface and a stand sidewall, and through the continuous connection way of longitudinal surface+lateral surface+longitudinal surface or longitudinal surface+lateral surface+stand sidewall+longitudinal surface, a continuous step surface is formed on the outer surface of the stand sidewall.

In some preferred embodiments, there is an angle of inclination of no more than 5° at the height direction between the longitudinal surface and the pallet body. This angle of inclination must be consistent with the angle of inclination of the inner surface of the stand sidewall. The longitudinal surface has a certain angle of inclination, to form a plug-in guidance, to reduce the hard contact during the insertion and facilitate the inserting between the upper stand and the lower stand.

In some preferred embodiments, the lateral surface is an outwardly bulging arcuate surface. As described above, the arcuate surface can reduce the wear during the insertion, and since the stand is the exposed component of the pallet, the outer wall of the stand sidewall is easy to contact and collide with other objects during use. If there is a sharp part on the outer wall, it is easy to damage other objects during use. Therefore, the lateral surface is set to an arcuate surface, which can meet the use requirements.

In some preferred embodiments, the width of the lateral surface is related to the angle of inclination of the stand sidewall and the length of the longitudinal surface. Generally, at a stand height, 10-12 longitudinal surfaces are arranged, and 10-12 lateral surfaces are also arranged correspondingly. The length of the longitudinal surface is equal, and the length and the curvature of the lateral surface are also equal, the smaller the number of longitudinal surfaces, the larger the angle of inclination of the stand sidewall, the larger the size of the lateral surface. If the angle of inclination of the longitudinal surface is large, the size of the lateral surface will be reduced accordingly to achieve an optimal force ratio. For example, in one embodiment, 10 longitudinal surfaces and 10 lateral surfaces are arranged, the angle of inclination of the longitudinal surface is 3°, and the curvature diameter of the lateral surface is equivalent to ⅓-¼ of the length of the longitudinal surface. At this time, it is an embodiment of the optimal force ratio, and the force of the stand sidewall is most uniform at this time, and the force is basically the same as that of other parts of the pallet body, and local fracture will not occur.

In some preferred embodiments, the second step surface calculated from the top of the stand has only a lateral surface or a longitudinal surface, and the only lateral surface or the longitudinal surface is a slightly outwardly convex arc surface. Since the first step is just at the connection bending position of the stand and the pallet body, and the second step connected to the first step is set to an excessive arc surface, which can effectively alleviate the stress concentrated at the bending position, so that the connection and transition of the bending position and stand sidewall are more smooth.

In some preferred embodiments, a reinforcing rib is provided on one of the side walls or sides of the corner stand and the edge stand, and the reinforcing rib extends downward from the opening of the stand to the middle position of the stand, the reinforcing rib forms an inward concave portion on the inner surface of the stand sidewall, and forms an outward convex portion on the outer surface of the stand sidewall. The role of the reinforcing rib is to balance the stress unevenness of the edges caused by the uneven distribution of the corner stand and the edge stand due to the connection with the reinforcing rib, for example, taking the corner stand as an example, the upper opening of the corner stand is in communication with the reinforcing rib at a corner toward the center, and the two sides adjacent to the corner are also in communication with the reinforcing rib, so that the stand has a connection structure with the reinforcing rib at the position with three upper openings towards the interior of the pallet. This connection structure makes the top of the stand open at three places, which inevitably causes the pressure stress distribution generated at the three places to be different from other parts, and all of the three places are located at the half of the stand close to the inner side of the pallet. At this time, a reinforcing rib is arranged on a corner of the stand facing the outside of the pallet, to balance the openings formed by the above three connections, so that the overall opening distribution of the pallet is relatively average without completely different pressure bearing capacity when subjecting to pressure. For another example, as an edge stand, a reinforcing rib is provided on the side facing toward the outermost side of the pallet. As stated previously, it is to balance the force for the opening formed by other edge of the edge stand upper end opening and the reinforcing rib. Regardless of corner stand or edge stand, as its connection with the reinforcing rib is relatively distributed evenly, the reinforcing rib is usually located at the corner or the middle of the edge. Correspondingly, as the center stand is connected to the reinforcing rib and distributed evenly along the opening, therefore, it is not necessary to set up the reinforcing rib.

In some preferred embodiments, the upper opening of the reinforcing rib is larger than the lower opening of the reinforcing rib, on the one hand, such structural design is consistent with the shape of the stand itself, because the upper opening of the stand itself is greater than that of the bottom plate, and on the other hand, the "big top and small bottom" size is more consistent with the direction of the force transmission and more conducive to the pressure bearing of the stand.

In some preferred embodiments, the both ends of the connection of the reinforcing rib and the inner wall of the stand form an excessive fillet, and the lower end of the reinforcing rib and the inner wall of the stand must be connected. This requires a transition shape, and usually the connection is a line, but the hard connection such as line is prone to product shape stress. To alleviate this stress concentration, the ends of the connection can be in a fillet shape. In some preferred embodiments, the whole bottom of the reinforcing rib adopts a fillet for transition, without straight line. It has been proved that the fillet transition can produce the minimum shape stress on the stand sidewall.

In some preferred embodiments, the outer wall of the reinforcing rib has a corner, whose shape forms an excessive arc surface. Relatively speaking, the inward titling angle above the corner is less, while the inward titling angle below the corner is large, therefore, there is an angle between the part below the corner and the part above the corner. The corner, as a connection between the two sections and a transition, has a height of no less than first grade step surface and no greater than second grade step surface. The corner has a certain size, otherwise the transition part is not strong, but it should not be too large, otherwise it will affect the overall shape of the reinforcing rib, without producing effect. The surface of the outer wall of the reinforcing rib is flat. On the one hand, it is convenient for the insertion of the stand part when the upper and lower pallets are stacked. On the other hand, the presence of the reinforcing rib can limit and guide the upper and lower pallet when stacking, so that the pallets are neater when stacked together. In some preferred embodiments, the depth of the reinforcing rib is greater than ½ of the depth of stand and less than ⅔ of the depth of stand.

In a fourth aspect, the present invention provides a mold for preparing the equal-fork pallet, comprising an upper mold structure and a lower mold structure. Under the action of the molding machine, the upper mold structure and the lower mold structure can be opened and closed to form the pallet.

The upper mold structure comprises an upper mold base plate, an upper mold backing plate, an upper mold template, and an upper mold hot platen, the upper mold base plate is used to connect with the molding machine and fix the entire upper mold structure on the molding machine, the upper surface of the upper mold base plate is connected to the mounting part of the molding machine, and the lower surface of the upper mold base plate is fixedly connected to the upper mold hot platen, and the upper mold hot platen is provided with a plurality of mold heating tubes uniformly distributed in the same direction, and the lower surface of the upper mold hot platen is fixedly connected to the upper mold template, the upper mold template and the upper mold hot platen are provided with an upper mold backing plate, and the lower surface of the upper mold template can be mounted with a stand mold core in a plug-in way, the upper surface of the upper mold backing plate is provided with a cooling liquid channel that is arranged on the side of the upper mold hot platen.

In some preferred embodiments, a clamping convex block is provided above the stand mold core, and a clamping part connected to the stand mold core is provided on the lower surface of the upper mold template, and the clamping part protrudes from the lower surface of the upper mold template, moreover, the clamping part has an outer surface conforming to the shape of the inner wall of stand, and the middle portion of the clamping part is provided with a recessed area matching the clamping convex block, and the stand mold core is detachably mounted on the upper mold template by the cooperation of the clamping convex block and the recessed area. And, after the stand mold core is mounted, the outer surface thereof forms a continuous smooth surface with the outer surface of the clamping part, and the continuous smooth surface has a consistent shape with the inner surface of the stand sidewall corresponding to the stand mold core.

In some preferred embodiments, the lower surface of the upper mold template is provided with a reinforcing rib convex mold for pressing the upper surface of the reinforcing rib in a portion other than the clamping part, and the reinforcing rib convex mold comprises a clamping part that connects the corresponding edge stand, a transverse connection type reinforcing rib convex mold of the adjacent clamping part corresponding to the corner stand, a first oblique connection type reinforcing rib convex mold connecting the clamping part of corresponding corner stand and the clamping part of corresponding center stand, a second oblique connection type reinforcing rib convex mold connecting two adjacent clamping parts corresponding to the edge stand, and a semi-partition transverse reinforcing rib convex mold with one end connecting to the clamping part of corresponding edge stand and another end extending to the clamping part of corresponding center stand, and a partition arcuate reinforcing rib convex mold.

In some preferred embodiments, the first oblique connection type reinforcing rib convex mold forms a large cross-shaped convex mold taking the clamping part of the corresponding center stand as a center, and the first oblique connection type reinforcing rib convex mold and second oblique connection type reinforcing rib convex mold cross to form a small cross-shaped convex mold, which forms a small triangle with the corresponding transverse connection type reinforcing rib convex mold. The partition arcuate reinforcing rib convex mold is disposed in the small triangular area.

These reinforcing rib convex molds are used for forming the upper surface of the reinforcing rib on the pallet. The sections of protruding part of the reinforcing rib convex molds are all smooth arc surfaces, and the inner surface of the formed reinforcing rib is also a smooth arc surface, which can minimize the edge stress of the pallet and improve the bearing ability of the pallet. The arcuate reinforcing ribs adopt a partition method, which can enhance the bearing capacity of the pallet edge and avoid the formation of stress concentration area at the pallet stand position.

In some preferred embodiments, the upper mold backing plate has connecting lugs on both sides, and the connecting lugs are symmetrically distributed on the edges on both sides of the upper mold backing plate. The connecting lug is integrally formed with the upper mold backing plate, and the mounting lug is provided with a mounting hole. The upper mold base plate and the upper mold backing plate are detachably fixed by a connecting lug. In some preferred embodiments, the outer edge on both sides of the upper mold base plate with the same direction of connecting lug is in flush with the outer edge of the connecting lug, the other two sides of the upper mold base plate is located in the range of the upper mold backing plate, and the position at the both sides should cover the upper mold hot platen and expose the cooling liquid channel (at least part of the cooling liquid channel), so that the cooling liquid can be added from this part to the cooling liquid channel. If the upper mold base plate is too large and it is unable to expose the cooling liquid channel after installation, it may be unable to add cooling liquid or may cause interference with the position of the cooling liquid adding tube.

In some preferred embodiments, the stand mold core comprises four corner stand mold cores, a center stand mold core, and four edge stand mold cores, wherein the length of the edge stand mold core along the side of the edge stand is greater than the length along the perpendicular direction. The edge stand mold core has the same shape as the edge stand, and its cross section is integrally rectangular, and the four corners of the rectangle are rounded. The edge stand mold core gradually tilts inwardly from top to bottom, the inclined surface is arc surface, moreover, at the part of the outer end of the edge stand mold core, the inclined surface is cut flat to form two V-shaped sections, and the outermost ends of the two sections are connected by a smooth arc surface. The connecting part of the arc surface corresponds to the bottom groove of the edge stand. The edge stand mold core has an edge protrusion matching the shape of the reinforcing rib on one side of the long side, and the edge protrusion extends downward to ½-⅔ of the height of the edge stand mold core, and the outer surface of the edge protrusion has edge bending and the bending position has an excessive arc surface, and the edge bending is located in the middle of the entire protrusion; the section of the corner stand mold core forms a square integrally, and four corners of this square are rounded. The corner stand mold core gradually tilts inwardly from top to bottom, the inclined surface is arc surface, moreover, at the part of the outer end of the edge stand mold core, the inclined surface is cut flat to form two V-shaped sections, and the outermost ends of the two sections are connected by a smooth arc surface. The connecting part of the arc surface corresponds to the bottom groove of the corner stand. The corner stand mold core has an protrusion matching the shape of the reinforcing rib at one of the four corners and the protrusion extends downward to ½-⅔ of the height of the edge stand mold core, and the outer surface of the corner protrusion has corner bend and the corner bend position has an excessive arc surface, and the corner bend is located in the middle of the entire corner protrusion.

In some preferred embodiments, the upper mold hot platen is provided with an upper mold heating channel, whose cross section is a quadrangle. The upper mold heating channel has a section length of not less than the diameter of the mold heating tube, so that the mold heating tube can rotate within the upper mold heating channel, making heat transfer more uniform, moreover, there is a certain gap between the heating channel itself and the mold heating tube, which facilitates the replacement of the mold heating tube.

In some preferred embodiments, the heating joint is provided at both ends of the mold heating tube. The heating joint comprises an insulating sleeve directly sleeved on both ends of mold heating tube, and the insulting sleeve is provided with an opening. The electrical connector connected to the heating tube fixedly is provided in the insulating sleeve. The electrical connector is provided with a double nut structure, comprising two layers of inner and outer nuts. A double-layer gasket is placed between the inner and outer layers of nuts. Thus, the spacing between the inner and outer layers of nuts can be adjusted by rotating the nuts, so that accessories such as wires can be held between the double-layer gaskets to make the electrical connection more firmly.

The lower mold structure comprises a lower mold base plate, a lower mold support rod, a lower mold hot platen, and a lower mold template, the upper end of the lower mold support rod is fixedly connected to the lower surface of the lower mold base plate, and the lower end of the lower mold support rod is provided with a connecting seat that is used to connect with the molding machine and fix the entire lower mold structure on the molding machine, the lower mold support rod and the connecting seat can be integrally formed, the upper end of the lower mold support rod can be fixed by plugging, snapping, or integrally formed with a lower mold base plate, a lower mold hot platen is provided above the lower mold base plate, and a lower mold template is provided above the lower mold hot platen.

In some preferred embodiments, a first lower mold heating channel is provided between the lower mold hot platen and lower mold template, and a second lower mold heating channel is provided between the lower mold base plate and the lower mold hot platen. The first lower mold heating channel and the second lower mold heating channel have the same direction, but they are staggered up and down, to form a heating channel group. As shown in the figure, each heating channel group includes four heating channels, and two heating channels on the lower layer are located in two heating channels on the upper layer, that is, the connecting lines of each group of heating channel constitute an inverted trapezoid, by this way, a trapezoid will be formed between the adjacent heating channel groups. This arrangement staggers the heating channel up and down, and relatively speaking, it has a wide coverage and it is more uniform.

In some preferred embodiments, a mold heating tube may be disposed in the heating channel. The arrangement direction of the mold heating tube in the lower mold structure is perpendicular to that of the mold heating tube in the upper mold structure.

In some preferred embodiments, the cross sections of the first and second lower mold heating channels are both quadrangle, and the side length of the quadrangle section is not less than the diameter of the mold heating tube, so that the mold heating tube can be rotated in the upper mold heating channel to make heat transfer more uniform, in addition, there is a certain gap between the heating channel itself and the mold heating tube, to facilitate the replacement of the mold heating tube.

In some preferred embodiments, the heating joints are provided on both ends of the mold heating tube. The heating joint comprises an insulating sleeve directly sleeved on both ends of mold heating tube, and the insulting sleeve is provided with an opening. An electrical connector connected to the heating tube fixedly is provided in the insulating sleeve. The electrical connector is provided with a double nut structure, comprising two layers of inner and outer nuts. A double-layer gasket is placed between the inner and outer layers of nuts. Thus, the spacing between the inner and outer layers of nuts can be adjusted by rotating the nuts, so that accessories such as wires can be held between the double-layer gaskets to make the electrical connection more firmly.

In some preferred embodiments, the lower mold template is provided with a stand opening, and the stand opening corresponds to each stand of the pallet. For example, there are nine stands in the pallet in the invention, so nine stand openings are provided on the lower mold template. The stand mold core can pass through these stand openings and stick out of the lower mold template when mold closing.

In some preferred embodiments, the shape of the stand opening is the same as that of the stand. The inner wall of the opening is provided with a step surface that is consistent with the shape and inclination of the outer surface of the stand sidewall. In some preferred embodiments, the stand mold core corresponding to each stand passes through the corresponding opening, and the spacing between the stand mold core and the opening is consistent with the thickness of the stand sidewall.

In some preferred embodiments, the lower mold template only corresponds to a part of the length of the stand sidewall, and the other part of the stand forming structure is located on the lower mold hot platen, that is, the lower mold hot platen also has corresponding nine stand openings. And, on the inner wall of the stand opening on the lower mold hot platen, a step surface that is consistent with the outer surface shape and the slope of the stand sidewall is further provided. A portion of the stand mold core can be inserted into the stand openings of the lower mold hot platen during mold closing, and the spacing from the inner walls of the stand openings is consistent with the thickness of the stand sidewall.

In some preferred embodiments, the size of the step surface gradually decreases from top to bottom in the stand opening of the lower mold template, and the size of the step surface gradually decreases from top to bottom in the stand opening of the lower mold hot platen, moreover, the gradual change of stand opening in the lower mold template and lower mold hot platen is continuous respectively and by connection. The "continuous respectively" means that the gradual change of stand opening in the lower mold template and lower mold hot platen respectively is continuous, and the "continuous by connection" means that the gradual change of the connection of the lower mold template and the lower mold hot platen is continuous. The so-called "continuous" means that the gradual change degree is consistent, for example, the degree of reduction of the upper stage and the lower stage is uniform, and if the separation is located on the same first grade step surface, the "continuous" means that the separation is continuous, without breaking.

In some preferred embodiments, at the bottom of the stand opening of the lower mold hot platen, there is a square or rectangular plane conforming to the shape of the bottom outer surface of the stand, and the four corners of this plane can be rounded. In some preferred embodiments, a reinforcing rib concave mold with the same shape as the reinforcing rib on the pallet stand is provided in the stand opening of the lower mold template and the stand opening of the corresponding lower mold hot platen.

In some preferred embodiments, the portion corresponding to the reinforcing rib bending position of the stand is formed in the lower mold template, and the portion corresponding to the stand reinforcing rib bending position is formed in the lower mold heating plate.

In some preferred embodiments, the upper surface of the lower mold template is provided with a reinforcing rib concave mold for pressing the lower surface of the reinforcing rib, and the reinforcing rib concave mold comprises a transverse connection type reinforcing rib concave mold connecting the stand opening of edge stand and the stand opening of the corresponding adjacent corner stand, a first oblique connection type reinforcing rib concave mold respectively connecting stand opening of each corresponding corner stand and the stand opening of corresponding center stand, a second oblique connection type reinforcing rib concave mold connecting the stand openings of two adjacent edge stands, a semi-partition transverse reinforcing rib concave mold whose one end is connected to the stand opening of corresponding edge stand and the other end extends to the stand opening of corresponding center stand, and a partition arcuate reinforcing rib concave mold.

In some preferred embodiments, the first oblique connection type reinforcing rib convex mold forms a large cross-shaped convex mold taking the clamping part of the corresponding center stand as a center, and the first oblique connection type reinforcing rib convex mold and second oblique connection type reinforcing rib convex mold cross to form a small cross-shaped convex mold, which forms a small triangle with the corresponding transverse connection type reinforcing rib convex mold. The partition arcuate reinforcing rib convex mold is disposed in the small triangular area.

These reinforcing rib convex molds are used for forming the upper surface of the reinforcing rib on the pallet. The sections of protruding part of the reinforcing rib convex molds are all smooth arc surfaces, and the inner surface of the formed reinforcing rib is also a smooth arc surface, which can minimize the edge stress of the pallet and improve the bearing ability of the pallet. The arcuate reinforcing ribs adopt a partition method, which can enhance the bearing capacity of the pallet edge and avoid the formation of stress concentration area at the pallet stand position.

The reinforcing rib concave mold on the lower mold template corresponds to the reinforcing rib convex mold on the upper mold template, and the spacing between them is the same as the thickness of the template when closing mold.

In some preferred embodiments, the thickness of the lower mold template is mainly considered to be able to accommodate the lower surface of the reinforcing rib. Therefore, the thickness of the lower mold template needs to exceed the depth of the reinforcing rib, but in order to meet certain strength requirement, in general, the thickness of the lower mold template is twice as the depth of the reinforcing rib, here, the depth of the reinforcing rib is the vertical distance from the upper surface of the formed pallet to the lower surface of the reinforcing rib.

The present invention can achieve the following beneficial effects. The equal-fork pallet in the invention is made by environmentally-friendly material through one-time press-molding of molding machine. It is easy and convenient to produce, and the materials are easily available, with low cost and it is environmentally friendly. More importantly, in the present invention, the stand structure and the reinforcing rib structure of the equal-fork pallet is improved on the basis of the existing pallet, and makes its pressure bearing capacity to greatly enhance through the structural design without changing its production process.

DETAILED DESCRIPTION

The present invention is further described in combination with drawings. It should be noted that the embodiments are only a detailed description of the implementation of the invention, and should not be construed as limiting the invention.

Figure 23:
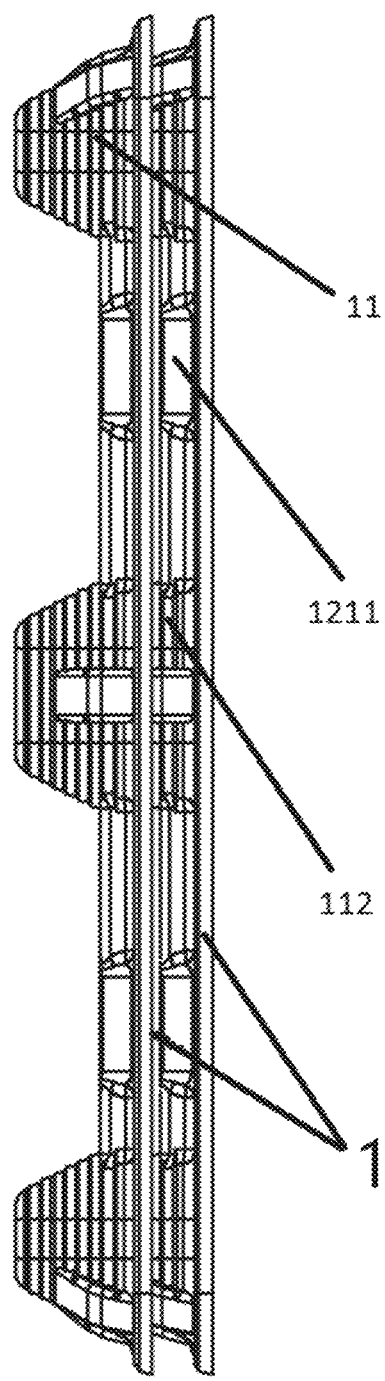
FIG. 23 is a schematic view of pallets stacked together in the present invention.
Notes:
Pallet body 1,
stand structure 11,
reinforcing structure 12,
pallet edge 13,
corner stand 111, edge stand 112,
center stand 113,
reinforcing rib 114,
both ends 1142 of connection 1141 between reinforcing rib and stand sidewall inner surface,
corner 1143,
stand sidewall 115,
stand bottom plate 116,
step surface 117,
longitudinal surface 1171,
lateral surface 1172,
connection type reinforcing rib 121,
notch 1211,
partition type reinforcing rib 122,
semi-partition type reinforcing rib 123,
four cross-shaped reinforcing rib groups 124,
large cross-shaped reinforcing rib group 125,
square 126,
four small triangular areas 127,
non-closed small triangular area 128,
upper mold structure 2,
upper mold base plate 21,
upper mold backing plate 22,
connecting lug 221,
mounting hole 2211,
upper mold template 23,
cooling liquid channel 231,
clamping part 232,
recessed area 2321,
reinforcing rib convex mold 233,
transverse connection type reinforcing rib convex mold 2331,
first oblique connection type reinforcing rib convex mold 2332,
second oblique connection type reinforcing rib convex mold 2333,
semi-partition transverse reinforcing rib convex mold 2334,
partition arcuate reinforcing rib convex mold 2335,
upper mold hot platen 24,
upper mold heating channel 241,
stand mold core 25,
clamping convex block 251,
corner stand mold core 252,
corner protrusion 2521,
corner bend 25211,
center stand mold core 253,
edge stand mold core 254,
lower mold structure 3,
lower mold base plate 31,
lower mold support rod 32,
connecting seat 321,
lower mold hot platen 33,
stand opening 331,
lower mold template 34,
stand opening 341,
reinforcing rib concave mold 342,
transverse connection type reinforcing rib concave mold 3421,
first oblique connection type reinforcing rib concave mold 3422,
second oblique connection type reinforcing rib concave mold 3423,
semi-partition transverse reinforcing rib concave mold 3424,
partition arcuate reinforcing rib concave mold 3425,
first lower mold heating channel 35,
second lower mold heating channel 36,
heating channel group 37,
reinforcing rib concave mold 38,
mold heating tube 4,
heating joint 41,
insulating sleeve 411,
electrical connector 412,
nut 413,
double-layer gasket 414.

As shown in FIGS. 1-11, the present invention provides an equal-fork pallet comprising a pallet body 1. The pallet body 1 is provided with a stand structure 11 and a reinforcing structure 12. The stand structure 11 and the reinforcing structure 12 are both protruded from the lower surface of the pallet body 1, and the stand structure 11 forms a supporting structure of the pallet body 1. The pallet body 1 can be overhead by the supporting structure so that there is a spacing between the lower surface of the pallet body and the underlying object. If there is no stand structure, the lower surface of the pallet body 1 will directly contact the placement plane, or directly contact the object of the next layer and/or the upper surface of the pallet, which will produce large-area friction during the process of forking and stacking, etc. As the pallet usually carries objects of large weight, it is unfavorable for operation and causes a great degree of wear on the contact surface of the pallet if the friction area is increased, greatly shortening the life of the pallet. In addition, without the overhead of the supporting structure, the contact surface of the pallet may be close together due to heavy load. When the state is maintained for a long time, the gas between the two contact surfaces may be completely emptied, or even two surfaces merge together, which is difficult to separate. Therefore, some overhead structures need to be disposed on the pallet body 1. The overhead structure can meet the requirements. When different pallets of the same specification are stacked together, a part of the surface may contact each other between the overhead structures of the adjacent pallets of the upper and lower layers, and another part of surface may not contact each other, for example, when the pallet is stacked together, the stand of the upper pallet can be inserted into the stand of the lower pallet, but only a part of it can be inserted, for example, ⅓, so that a gap can be left inside the stand structure, without complete fitting, or a gap may exist between the upper and lower pallets, to prevent the surface from being excessively fitted or tightly attached for a long time when the pallet is stored, as shown in FIG. 23.

Figure 1:
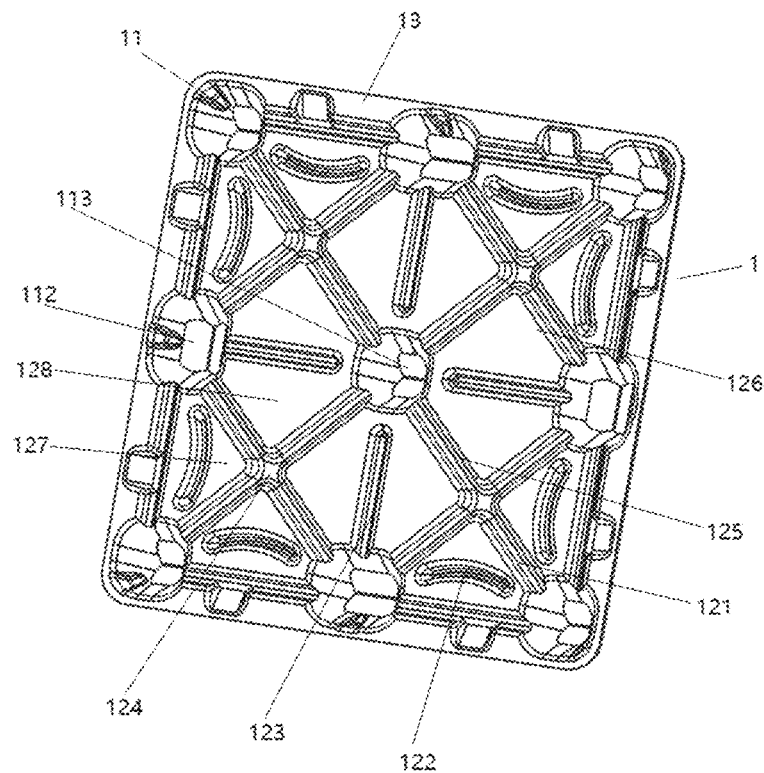
FIG. 1 is a front structural view of the present invention.
Figure 2:
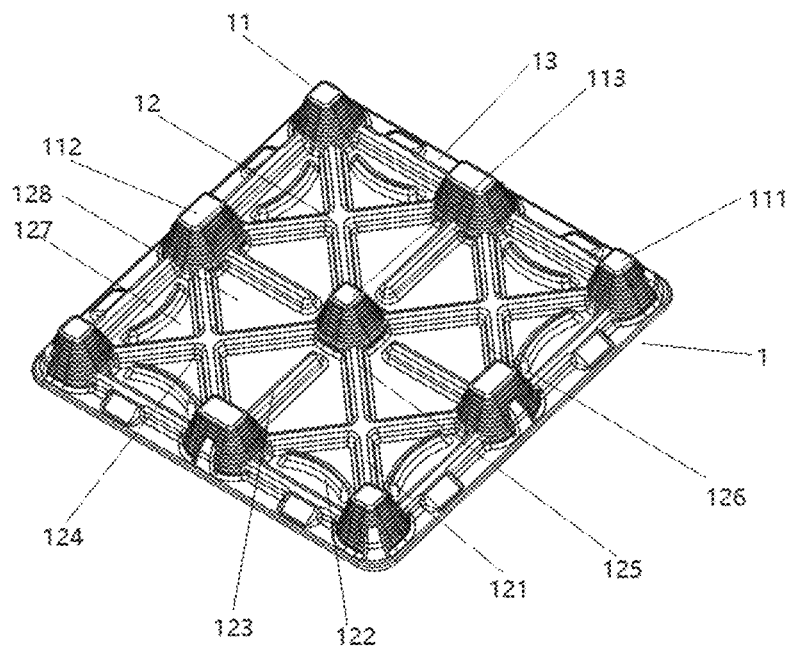
FIG. 2 is a bottom structural view of the present invention.

As shown in FIGS. 1-2, the pallet body 1 is quadrangle as a whole, and the four sides of the quadrangle, i.e. the edges 13 of the pallet, are all equal in length, so that the pallet can be placed in any direction (left and right or front and rear directions), which makes the pallet of the present invention different from the pallet of non-quadrangle structure. The ratio of length and width of some pallets may be adjusted, for some pallets of different length and width, usually it is only possible to fork from the long side or short side. For example, in one loading, the fork is uniformly crossed from the long side. There is requirement for the stacking direction of the pallet itself, for pallets with different lengths and widths, the distance for forking is different, and if it is forked from the short side, it may be impossible to meet the width requirement of the fork because the short side is short. If the forking width of the short side is met, then the forking width does not match the forking width of the long side, and it is easy to cause the actual forking width of the long side to be less than that of the long-side pallet, resulting in instability of long side when forking. In addition, if it is made to round shape, the round has no lateral sides, and it is difficult to find the forking direction; in addition, the edges of circular pallet are arc, which do not match the direction of the fork mechanism such as a forklift, increase the forking distance; in addition, the increased distance is not an effective distance, which is not conducive to forking. Therefore, it is appropriate to set the pallet body 1 as a quadrangle.

As a preferred embodiment, the outer edges of the four corners of the quadrangle are inverted into an arc shape, to make the four corners of the pallet body 1 not to be sharp ends but smooth arc ends. The arc shape is conducive to forming; and the four corners are arranged in an arc shape, which reduces the wear and cutting of the surrounding objects and environment by the pallet itself If the four corners of the pallet are sharp parts, it is very likely to hook to other items in addition to wear. The setting of arc shape can eliminate this phenomenon.

As shown in FIGS. 1-11, the reinforcing structure 12 of the pallet is mainly arranged on the surface of the pallet body 1. The reinforcing structure is mainly represented by a reinforcing rib, which is a groove structure suppressed on the surface of the pallet body. In terms of the connection relationship between the reinforcing rib and other structure, the reinforcing rib comprises a connection type reinforcing rib 121, a partition type reinforcing rib 122 and a semi-partition type reinforcing rib 123, which is mainly distinguished from the connection between the reinforcing rib and the stand. The reinforcing rib whose both ends are connected to the stand is called connection type reinforcing rib, and the reinforcing rib that is not connected to the stand (or other structure on the pallet) is called a partition type reinforcing rib, and the reinforcing rib whose one end is connected to the stand and the other end is not connected to the stand is called semi-partition type reinforcing rib. After analyzing the force of whole pallet and combining with the arrangement of the stand structure, it is preferred to arrange the three types of reinforcing ribs on one pallet simultaneously. The pressure bearing capacity is adjusted by the reinforcing rib caused by the structure and height between the pallet body and the stand structure. As the reinforcing way is different for different structure of the pallet body, different types of reinforcing ribs can be selected respectively, to balance the overall force of the pallet, improve the overall pressure bearing capacity of the pallet and substantially maintain consistent overall pressure bearing capacity of the pallet.

As a preferred embodiment, the connection type reinforcing rib, partition type reinforcing rib and semi-partition type reinforcing rib can be arranged according to the way shown in FIG. 1. A semi-partition type reinforcing rib 123 is provided between the edge stand 112 and the center stand 113, in this embodiment, one end of the semi-partition type reinforcing rib 123 is connected to the edge stand 112, and the other end extends to a position close to the edge of the center stand 113. In actual cases, one end of the semi-partition type reinforcing rib 123 is connected to the side of the center stand 113, and the other end extends to a position close to the side of the edge stand 112, which is mainly considered from other structure of the pallet. The semi-partition type reinforcing rib 123 is mainly used when there are excessive connections between a stand and a reinforcing rib and it is required to arrange reinforcing ribs due to great area of the pallet between the stand and other stand. For example, as shown in the FIG. 1, the center stand 113 has already connected four reinforcing ribs. If the reinforcing rib is connected in the remaining position, the opening of the entire center stand may be occupied by the reinforcing rib. In this case, the center stand and the reinforcing rib are disconnected, and the reinforcing rib is extended to the vicinity of the center stand, without affecting the reinforcing effect of the reinforcing rib, in addition, the connection between the center stand and the reinforcing rib is arranged reasonably. In some preferred embodiments, the pallet body is divided into four small square parts by these semi-partition type reinforcing ribs.

As shown from the figures, a connection type reinforcing rib 121 is provided between the corner stand 111 and the center stand 113 and the edge stand 112 on the adjacent side. The connection type reinforcing ribs 121 of the part are intercrossed to form four cross-shaped reinforcing rib groups 124, which are located on four parts separated by the semi-partition type reinforcing rib. In addition, the lines between the diagonal corner stand and the center stand are on the same line, so that a large cross-shaped reinforcing rib group 125 is formed integrally. The large cross-shaped reinforcing rib group 125 divides the entire pallet body into four triangular parts. The cross shape is a relatively stable form, and through the combination of an overall large cross and four small crosses, the whole pallet body is supported by the reinforcing structure. In addition, connection type reinforcing ribs 121 are provided between the edge stand 112 and the adjacent corner stand 111. The connection type reinforcing ribs 121 connect four edges of the pallet as a square 126, and the square 126 causes all the four corners on the edge of the pallet body to be linked into a whole, and the body between stands is reinforced and supported.

As shown in FIG. 1, the cross-shaped structure in the small square divides the small square area into four small triangular areas 127, wherein the edges of the two small triangular areas 127 are closed by two the connection type reinforcing rib 121 located between the edge stand 112 and the corner stand 113 on the side of the pallet, to form a closed small triangular area, while the other two small triangular areas form a non-closed small triangular area by taking the semi-partition type reinforcing rib 123 as a triangular hypotenuse. Relatively speaking, the non-closed small triangular area is closer to the center of the pallet. The center has a large bearing area and the pressure can be evenly distributed, and there is only one center stand in the center, with relatively uniform structure and relatively stable strength. However, the closed small triangular area is close to the edge of the pallet where the stress is easy to concentrate and the stands are densely distributed, especially the position close to the corner, therefore, an additional reinforcing structure is required to make the bearing ability of the whole pallet to be basically the same. Therefore, in some preferred embodiments, a partition type reinforcing rib is arranged in the closed small triangular area, and the partition type reinforcing rib corresponds to the closed small triangular area one by one. The main role of the partition type reinforcing rib is to strengthen the strength of the pallet edge and the corner, especially the strength of the closed small triangular area. In some preferred embodiments, the partition type reinforcing rib is an arcuate reinforcing rib, and both ends of which face toward both ends of the hypotenuse of the closed small triangular area, that is, to close the both ends of the connection type reinforcing rib located on the edge of the closed small triangular area. In prior art, similar arcuate reinforcing rib is arranged. For example, in the background art, an arcuate reinforcing rib is also provided in the equidistant forked pallet, but the arcuate reinforcing rib is usually connected to the stand. Actually, most pallets including the arcuate reinforcing rib in the prior art are connected to the stand. On the one hand, it is a conventional design method, and on the other hand, if an area that is completely separated from other areas for the equal-fork pallet, it will increase the difficulty of molding process and the mold opening process, because the molding materials in the separate area cannot be balanced with other areas. However, the technical solutions of the present invention do not have such difficulty, because the thickness of the reinforcing rib provided in the present invention is consistent with the thickness of the pallet itself, which can be achieved by adjusting the sizes of the upper and lower molds according to the shape. In the present invention, the section of the arcuate reinforcing rib is a "big top and small bottom" structure, and both ends of the arcuate reinforcing rib have excessive fillets, without affecting the mold opening. Moreover, if the connection type reinforcing rib is also used in the closed small triangular area, that is, the reinforcing rib itself is connected to the corner stand, then, as shown in the figure, the opening of the corner stand on the side toward the pallet will be completely occupied by the connection of the reinforcing rib. It is found in experiments and actual uses that such a reinforcing structure will cause stress concentration in the stand part, and the joint between the stand and the reinforcing rib is prone to brittle fracture, which will reduce the overall strength of the pallet by around 10%. Therefore, the closed small triangular area is strengthened by partition type reinforcing ribs. In some preferred embodiments, the distance between the ends of the partition type reinforcing rib and the edge of the upper end of the stand is not greater than the width of the reinforcing rib itself. Since the reinforcing rib still needs to be distributed on the surface of the pallet body as much as possible, the ends of the reinforcing rib must be close to the stand, and if the reinforcing rib cannot pass through, it will not strengthen a certain area.

In some preferred embodiments, a notch 1211 is provided on the transverse connection type reinforcing rib located on the pallet edge, and the notch can be conducive to mold lifting, or can be used as a clamping portion during the handling of the pallet itself.

The stand structure 11 in the present invention comprises a corner stand 111, an edge stand 112 and a center stand 113. The four corners of the quadrangle are respectively provided with four corner stands 111, and the four sides of the quadrangle are respectively provided with edge stands 112. The edge stands 112 are located in the middle of the two adjacent corner stands 111. In the center of the quadrangle pallet body, a center stand is provided, to form a relatively stable nine-stand structure. Usually, regardless of corner stand, edge stand or center stand, they have the same height, that is, when the pallet is placed flatwise, all the stand bottoms can be placed on the same plane.

As shown from FIG. 1, the overall shape of the center stand 113 is also a quadrangle, the quadrangle herein is the shape of the bottom plate of the center stand. The bottom plate of the corner stand 111 has the same size and shape as that of the center stand 113. The main difference between the corner stand 111 and the center stand 113 is that, the reinforcing rib 114 is provided on the corner stand 111, and the bottom plate of the edge stand 112 is rectangular, and the rectangular side with the same direction of the side of the rectangle is the long side, and the other two sides are short sides. In order to prevent a sharp end on the pallet, the four corners of the foregoing quadrangle and rectangle are rounded. The edge stand is set to a rectangle because the position between the edge stand and the corner stand is the fork position, and the width of the fork position must match with the fork component of the fork mechanism. As the corner stand cannot change in length, if the corner stand is increased wholly, it may affect the strength of the stand or even the entire pallet, while the length of the edge stand (ie, the length along the side) can be adjusted appropriately to regulate the spacing between the corner stand and the edge stand; moreover, by adjusting the distance between the corner stand and the edge stand through extending or increasing from the edge stand to the corner stand on both sides, the fork distance of the pallet itself can meet the fork requirements.

In the present invention, the shape of the stand is defined. The stand sidewall tilts inwardly, so that the stand forms a "big top and small bottom" shape. For the same specification of pallet, the size of the outermost end of the stand is obviously smaller than the size of the pallet opening, the upper stand can be inserted into the lower stand, but because the pallet has a thick wall and the stand has a large mouth, the stand of the upper pallet can only be partially inserted into the stand of the lower pallet, without complete fitting.

As shown in FIGS. 3-8, the stand comprises a stand sidewall 115 and a stand bottom plate 116. In this embodiment, the outer surface of the stand bottom plate is a plane and both sides of the inner surface are inclined toward the middle portion, to form a lowest portion in the middle portion. Alternatively, in this embodiment, the lowest portion is a U-shaped groove. Sometimes, the lowest portion is a V-shaped groove. U-shaped groove is wider at the bottom of the groove than that of the V-shaped groove. U-shaped groove can be used when the width of the pallet is large. When the pallet has a big width, relatively speaking, the stand will be greater correspondingly. When the thickness of the pallet does not change much, if the V-shaped groove is still used, it is possible that the stand sidewalls at both sides of the stand bottom groove is thick, and if the difference of thickness between the stand sidewall bottom and other parts is too large, it is not conducive to the uniform force of the stand. Therefore, U-shaped groove is used when the side length of the pallet exceeds 900 mm or the maximum width of the stand in the direction of the width of the V-shaped groove exceeds 60 mm. In some preferred embodiments, the width of the bottom of the U-shaped groove does not exceed ½ of the width of the bottom of the pallet, and the U-shaped groove should not be too wide, otherwise, the strength of joint between the stand bottom plate and the stand bottom plate and the stand sidewall will be affected. In some preferred embodiments, the direction of the groove is the same as the direction of one of the sides of the pallet. In some preferred embodiments, the groove and one of the sides of the pallet form an angle, for example, 15°, 30°, 45° or 60°, or other, and the angle can be adjusted according to the depth of stand and the angle of inclination of the stand sidewall. In some preferred embodiments, when the angle of inclination of the stand sidewall exceeds 30°, the inclination of the groove can be appropriately adjusted, because the larger the angle of inclination of the pallet sidewall, the larger the lateral stress and shear stress exerted on the pallet sidewall. When the inner surface of the stand bottom plate is a groove, the inner surface of the stand sidewall must have a slope matching the sides of the groove. At this time, the force exerted on the inner surface of the stand will be completely distributed on the slope. As a result, the force of the stand sidewall is concentrated on both sides of the slope, and the force exerted on another both sides is small or none, causing uneven force on the stand. If the groove direction of the inner surface of the stand bottom plate is appropriately changed, the slope will be distorted along the direction of the groove. In this case, the stand sidewall will bear the lateral component force, then the force exerted on the stand is relatively uniform, and the local force will not be excessive. In some preferred embodiments, the directions of the grooves in different stands on the same arrangement may be different, so that the divergence of the force distribution is better, to avoid the stress concentration. For example, the groove direction of the corner stand can be consistent with the oblique direction of the four corners, and the groove direction of the side edge stand can be opposite, so that the stress is evenly distributed in all directions.

The foregoing structure of the bottom plate is conducive to the mold lifting of the upper mold. However, in actual production, sometimes, other form of stand bottom plate can be used, for example, the inner surface and the outer surface of the stand bottom plate 116 are both planes. Or the outer surface of the stand bottom plate 116 is a plane, and the inner surface has a certain slope.

Figure 10:
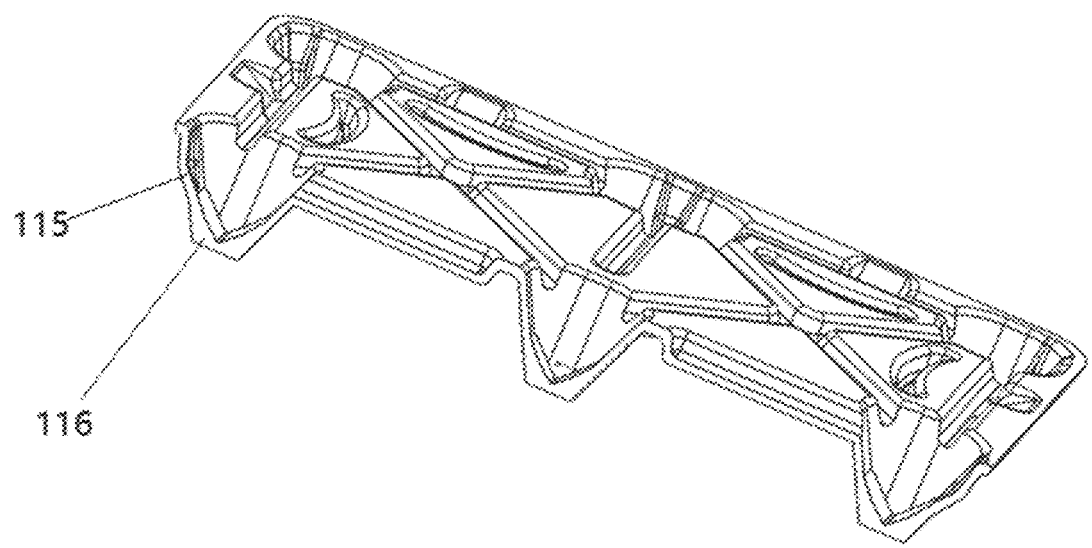
FIG. 10 is a cross-sectional view of the present invention.

In some preferred embodiments, the thickness of the stand bottom plate 116 is consistent with the thickness of the pallet body 1. The thickness of the stand bottom plate should be the minimum thickness of the stand bottom plate, that is, the thickness of the remaining stand bottom plate after excluding the thickness of the groove. In this embodiment, as shown in FIG. 10, the thickness of the stand bottom plate 116 is not less than the thickness of the pallet body 1. The stand bottom plate is the concentrated position that bears the stress and pressure of the whole pallet. Therefore, the thickness of the stand bottom plate must be guaranteed to ensure the overall support strength of the pallet, or even, the thickness of the connection between the stand bottom plate and the stand sidewall is greater than the thickness of the stand bottom plate, the connection between the stand bottom plate and the stand sidewall is usually a stress concentration point due to the bending of the structure. Therefore, a larger thickness is required to ensure strength. In this embodiment, the inner wall of the connection between the stand bottom plate 116 and the stand sidewall 115 is a smooth excessive arc surface which can partially offset the stress concentration at the bending portion.

Figure 4:
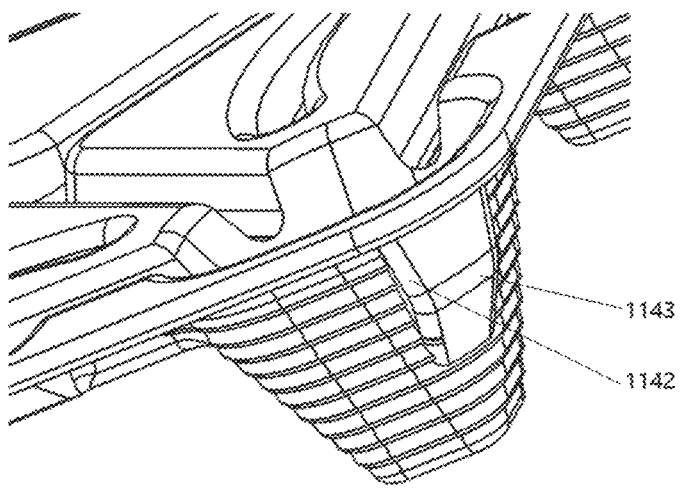
FIG. 4 is an external schematic view of a corner stand of the present invention.
Figure 6:
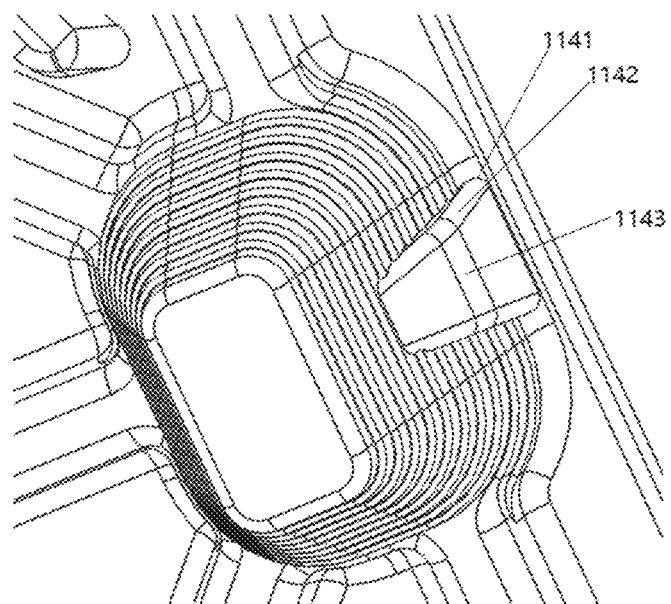
FIG. 6 is an external schematic diagram of an edge stand of the present invention.
Figure 7:
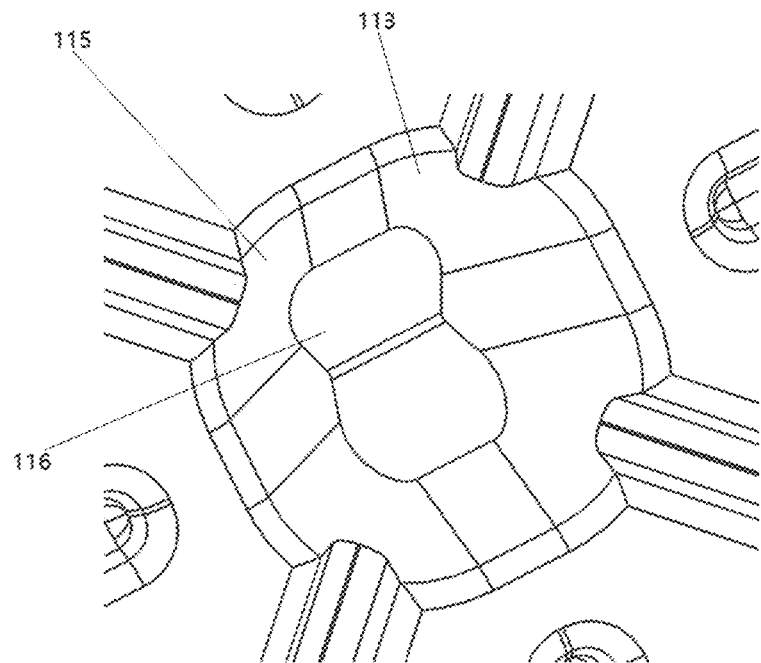
FIG. 7 is an internal schematic view of a center stand of the present invention.
Figure 8:
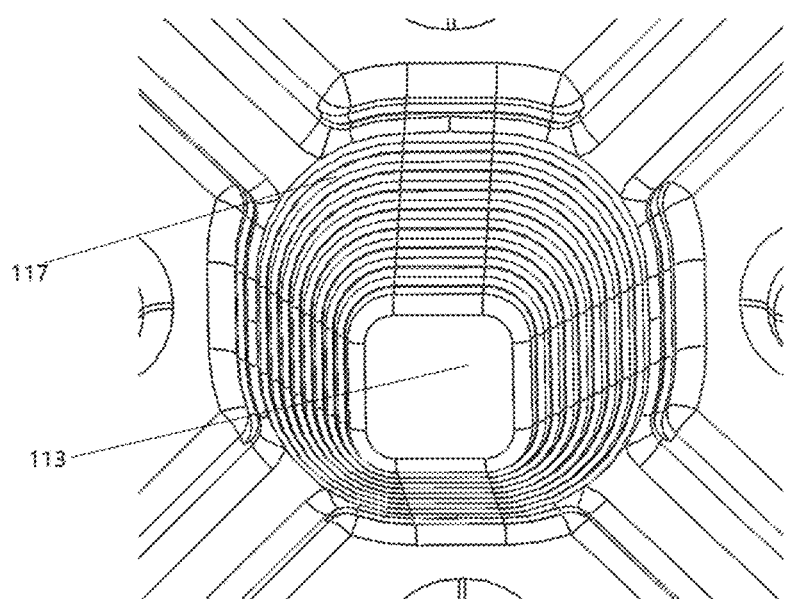
FIG. 8 is an external schematic view of a center stand of the present invention.
Figure 9:
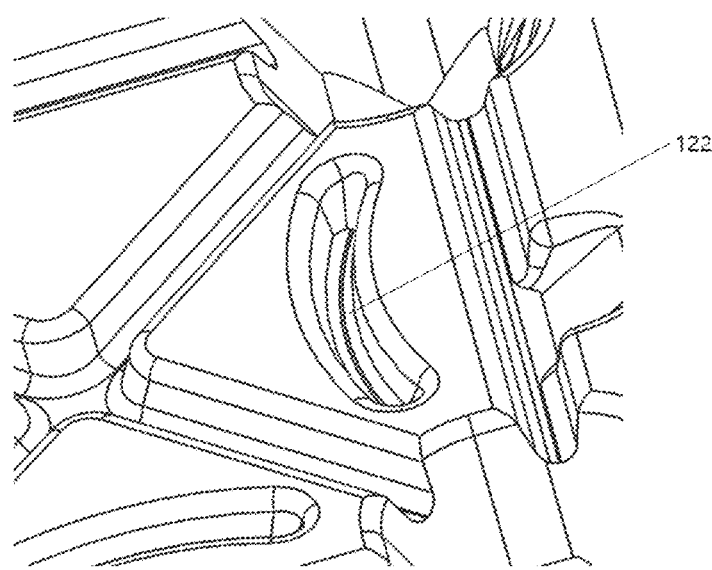
FIG. 9 is a schematic view of an arcuable reinforcing rib of the present invention.

As shown in FIGS. 2, 4, 6, 8, a step surface 117 is provided on the outer surface of the stand sidewall 115. Since the pallets are stacked together, the stand of the upper pallet is inserted into the stand of the lower pallet. Therefore, by setting the step surface, the contact of the upper and lower layers can be reduced, and thereby reducing the contact friction when the upper and lower pallets are stacked, and further, the continuous step surface forms an uneven shape on the outer surface of the stand sidewall, and the uneven shape has a peak shape and a valley shape, and the valley shape is inwardly recessed, the recessed valley shape can form a ventilation gap between the pallets, so that even if the number of stacks is large and the weight is large, the gap between the upper and lower pallets will not become small or even disappear due to the extrusion, to make the contact surface close together and difficult to separate. As shown in FIGS. 4, 6, 8, the outer edge of the step surface is processed into a smooth arc surface so as not to cause great wear on the inner wall of the lower pallet during stacking.

The thickness of the stand sidewall 115 is the same as the thickness of the palette body 1. Alternatively, the thickness of the stand sidewall 115 is less than the thickness of the palette body 1. However, the step surface 117 is disposed to protrude from the original thickness of the stand sidewall 115. Moreover, the overall thickness of the step surface 117 and the stand sidewall 115 is not less than the thickness of the pallet body 1, and the step surface 117 can increase the thickness of the stand sidewall 115 to some extent, therefore, the thickness of the stand sidewall 115 excluding the step surface can be appropriately reduced.

Figure 11:
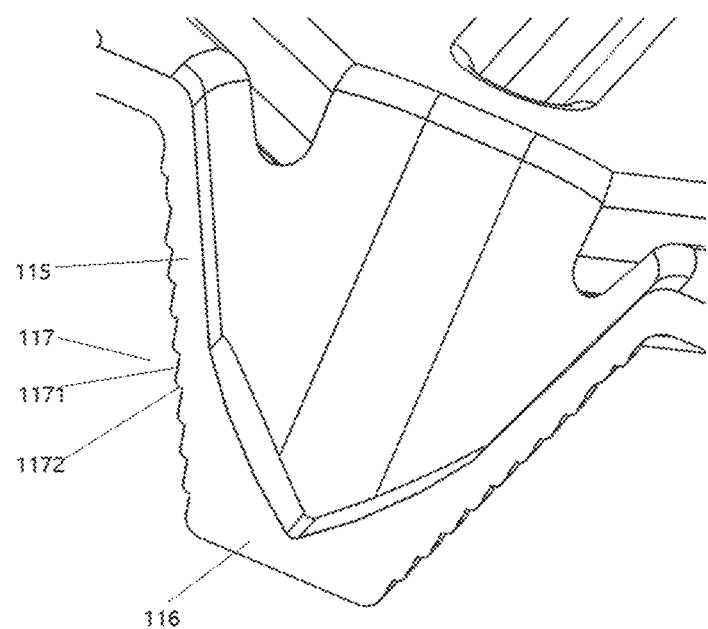
FIG. 11 is a partially enlarged view of FIG. 10.
Figure 12:
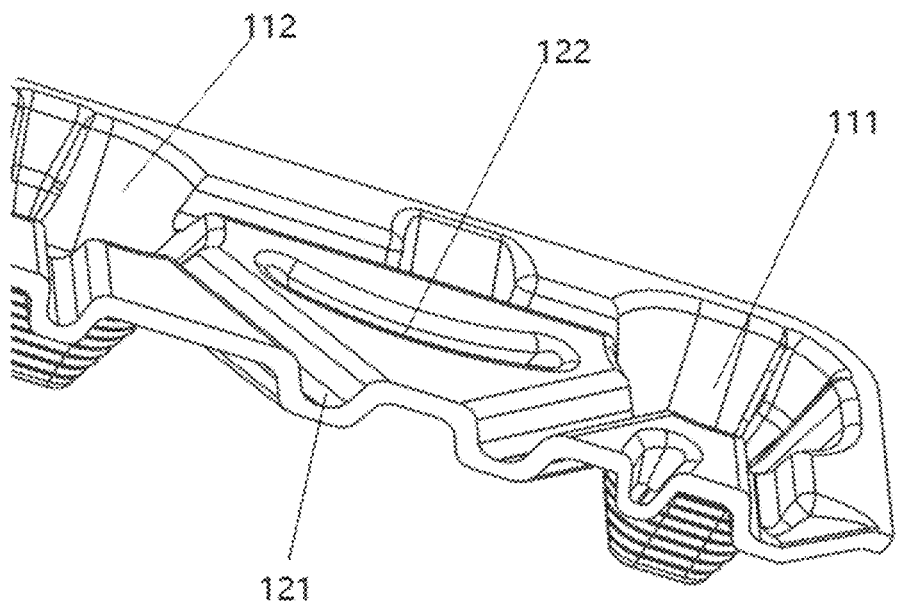
FIG. 12 is a cross-sectional view of the present invention in another position showing the cross-sectional structure of a reinforcing rib.
Figure 13:
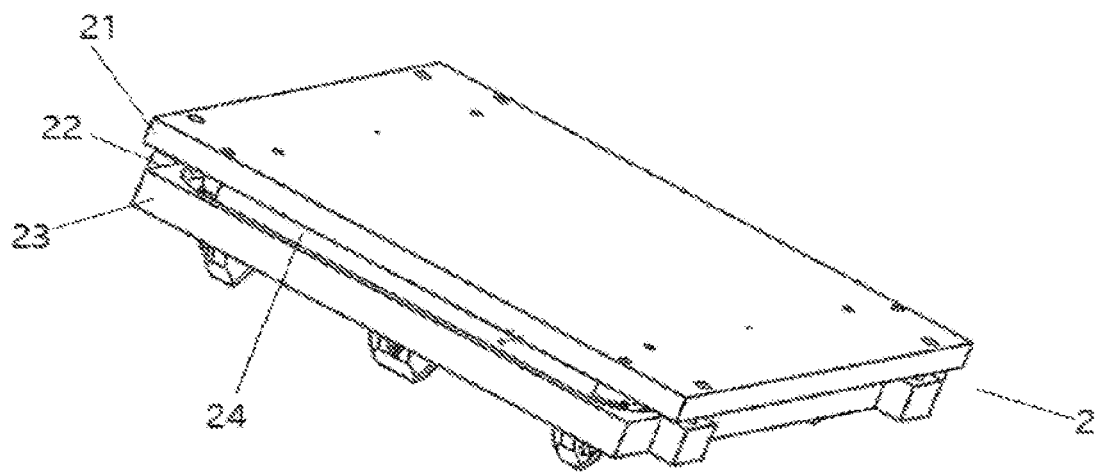
FIG. 13 is a schematic view of an upper mold structure of the present invention.
Figure 14:
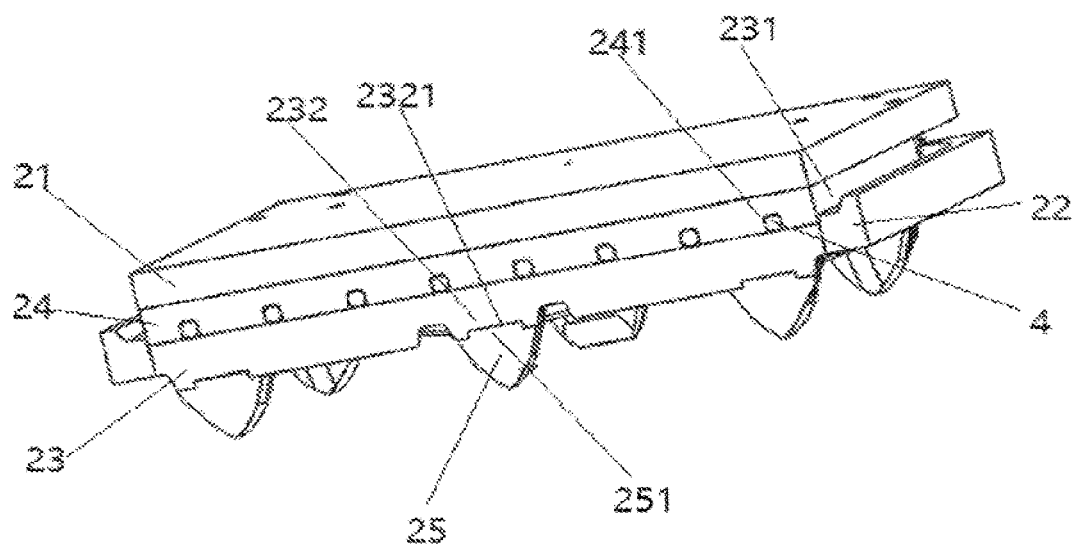
FIG. 14 is a cross-sectional view of an upper mold structure of the present invention.
Figure 15:
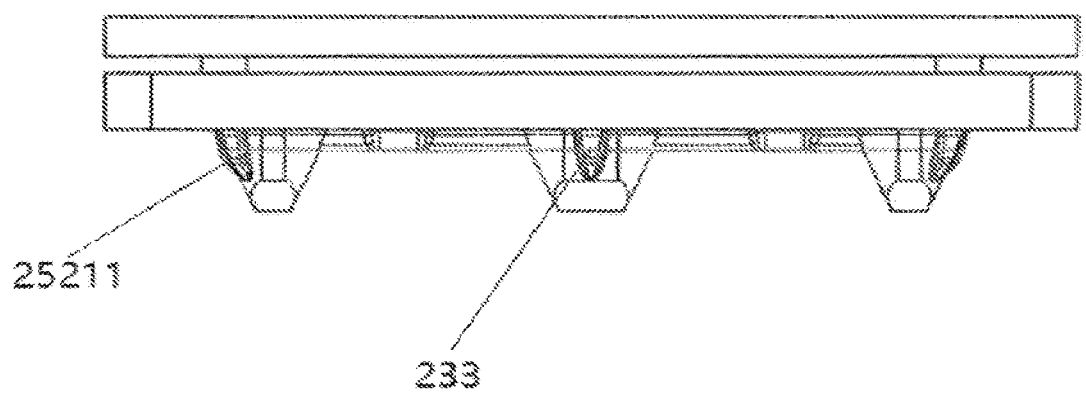
FIG. 15 is a top view of an upper mold structure of the present invention.

As shown in FIG. 11, the step surface 117 comprises a longitudinal surface 1171 and a lateral surface 1172, the longitudinal surface 1171 being arranged along the height of the pallet body, and the lateral surface 1172 being connected to two adjacent longitudinal surfaces, or connected to a longitudinal surface 1171 and a stand sidewall 115, and through the continuous connection way of longitudinal surface+lateral surface+longitudinal surface or longitudinal surface+lateral surface+stand sidewall+longitudinal surface, a continuous step surface is formed on the outer surface of the stand sidewall.

There is an angle of inclination of no more than 5° at the height direction between the longitudinal surface 1171 and the pallet body 1. This angle of inclination must be consistent with the angle of inclination of the inner surface of the stand sidewall. The longitudinal surface has a certain angle of inclination, to form a plug-in guidance, to reduce the hard contact during the insertion and facilitate the inserting between the upper stand and the lower stand.

The lateral surface 1172 is an outwardly bulging arcuate surface. As described above, the arcuate surface can reduce the wear during the insertion, and since the stand is the exposed component of the pallet, the outer wall of the stand sidewall is easy to contact and collide with other objects during use. If there is a sharp part on the outer wall, it is easy to damage other objects during use. Therefore, the lateral surface is set to an arcuate surface, which can meet the use requirements.

The width of the lateral surface 1172 is related to the angle of inclination of the stand sidewall 115 and the length of the longitudinal surface. For example, in this embodiment, at a stand height, 10 longitudinal surfaces 1172 are arranged, and 11 lateral surfaces 1171 are also arranged correspondingly. The length of the longitudinal surface 1172 is equal, and the length and the curvature of the lateral surface are also equal, the smaller the number of longitudinal surfaces, the larger the angle of inclination of the stand sidewall, the larger the size of the lateral surface. If the angle of inclination of the longitudinal surface is large, the size of the lateral surface will be reduced accordingly to achieve an optimal force ratio. For example, in one embodiment, 10 longitudinal surfaces and 10 lateral surfaces are arranged, the angle of inclination of the longitudinal surface is 3°, and the curvature diameter of the lateral surface 1172 is equivalent to ⅓-¼ of the length of the longitudinal surface 1171. At this time, it is an embodiment of the optimal force ratio, and the force of the stand sidewall is most uniform at this time, and the force is basically the same as that of other parts of the pallet body, and local fracture will not occur.

As shown in FIG. 11, the second step surface calculated from the top of the stand has only a lateral surface or a longitudinal surface, and the only lateral surface or the longitudinal surface is a slightly outwardly convex arc surface. Since the first step is just at the connection bending position of the stand and the pallet body, and the second step connected to the first step is set to an excessive arc surface, which can effectively alleviate the stress concentrated at the bending position, so that the connection and transition of the bending position and stand sidewall are more smooth.

As shown in FIGS. 4 and 6, a reinforcing rib 114 is provided on one of the side walls or sides of the corner stand and the edge stand, and the reinforcing rib 114 extends downward from the opening of the stand to the middle position of the stand, the reinforcing rib 114 forms an inward concave portion on the inner surface of the stand sidewall 115, and forms an outward convex portion on the outer surface of the stand sidewall 115. The role of the reinforcing rib 114 is to balance the stress unevenness of the edges caused by the uneven distribution of the corner stand and the edge stand due to the connection with the reinforcing rib, for example, taking the corner stand as an example, the upper opening of the corner stand is in communication with the reinforcing rib at a corner toward the center, and the two sides adjacent to the corner are also in communication with the reinforcing rib, so that the stand has a connection structure with the reinforcing rib at the position with three upper openings towards the interior of the pallet. This connection structure makes the top of the stand open at three places, which inevitably causes the pressure stress distribution generated at the three places to be different from other parts, and all of the three places are located at the half of the stand close to the inner side of the pallet. At this time, a reinforcing rib is arranged on a corner of the stand facing the outside of the pallet, to balance the openings formed by the above three connections, so that the overall opening distribution of the pallet is relatively average without completely different pressure bearing capacity when subjecting to pressure. For another example, as an edge stand, a reinforcing rib is provided on the side facing toward the outermost side of the pallet. As stated previously, it is to balance the force for the opening formed by other edge of the edge stand upper end opening and the reinforcing rib. Regardless of corner stand or edge stand, as its connection with the reinforcing rib is relatively distributed evenly, the reinforcing rib is usually located at the corner or the middle of the edge. Correspondingly, as the center stand is connected to the reinforcing rib and distributed evenly along the opening, therefore, it is not necessary to set up the reinforcing rib.

Figure 3:
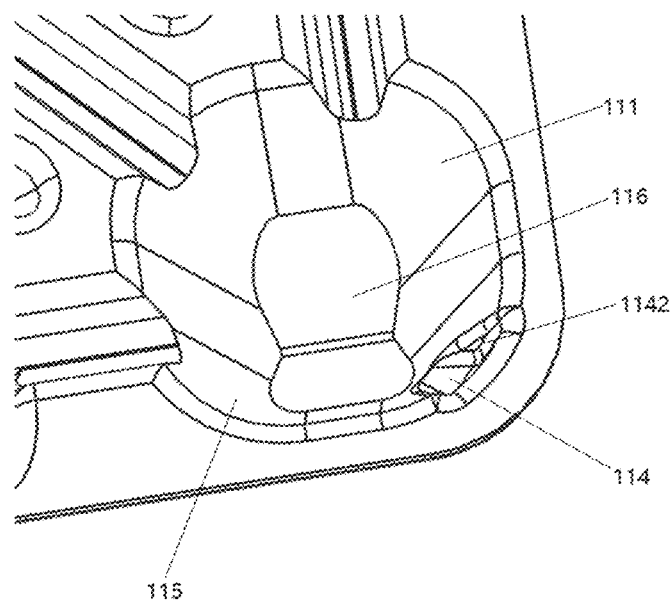
FIG. 3 is an internal schematic view of a corner stand of the present invention.
Figure 5:
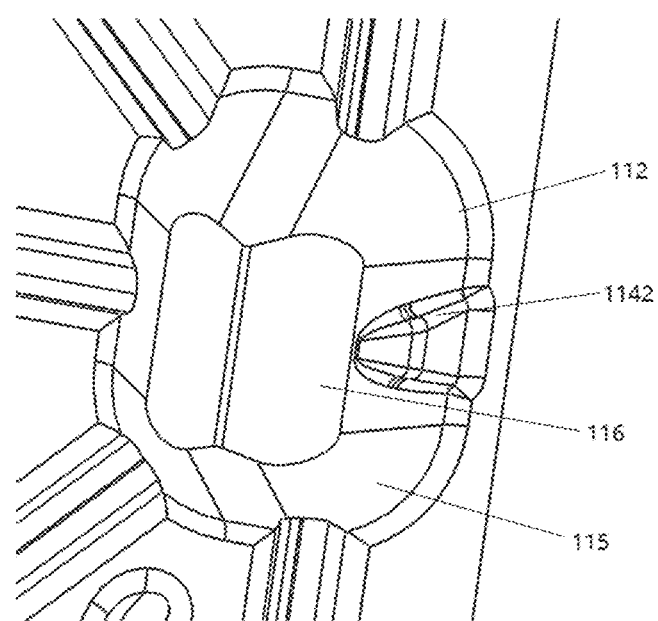
FIG. 5 is an internal schematic diagram of an edge stand of the present invention.

As shown in FIGS. 3 and 5, the upper opening of the reinforcing rib is larger than the lower opening of the reinforcing rib, on the one hand, such structural design is consistent with the shape of the stand itself, because of the upper opening of the stand itself is greater than that of the bottom plate, and on the other hand, the "big top and small bottom" size is more consistent with the direction of the force transmission and more conducive to the pressure bearing of the stand.

As shown in FIGS. 3 and 5, the both ends 1142 of the connection 1141 of the reinforcing rib 114 and the inner wall 115 of the stand form an excessive fillet, and the lower end of the reinforcing rib and the inner wall of the stand must be connected. This requires a transition shape, and usually the connection 1141 is a line, but the hard connection such as line is prone to product shape stress. To alleviate this stress concentration, the ends of the connection can be in a fillet shape. In some preferred embodiments, the whole bottom of the reinforcing rib 1141 adopts a fillet for transition, without straight line. It has been proved that the fillet transition can produce the minimum shape stress on the stand sidewall. However, the fillets for all are only applicable to small stand parts. If the size of the stand is large, not all fillets can be used, which will result in an enlarged length. Therefore, in the case of a large size of the stand, the combination of lines and fillets can be used.

As shown in FIGS. 4 and 6, the outer wall of the reinforcing rib 114 has a corner 1143, whose shape forms an excessive arc surface. Relatively speaking, the inward titling angle above the corner 1143 is less, while the inward titling angle below the corner 1143 is large, therefore, there is an angle between the part below the corner and the part above the corner. The corner, as a connection between the two sections and a transition, has a height of no less than first grade step surface and no greater than second grade step surface. The corner has a certain size, otherwise the transition part is not strong, but it should not be too large, otherwise it will affect the overall shape of the reinforcing rib, without producing effect. As shown from the figure, the surface of the outer wall of the reinforcing rib 114 is flat. On the one hand, it is convenient for the insertion of the stand part when the upper and lower pallets are stacked. On the other hand, the presence of the reinforcing rib can limit and guide the upper and lower pallet when stacking, so that the pallets are neater when stacked together. In some preferred embodiments, the depth of the reinforcing rib is greater than ½ of the depth of stand and less than ⅔ of the depth of stand.

Figure 22:
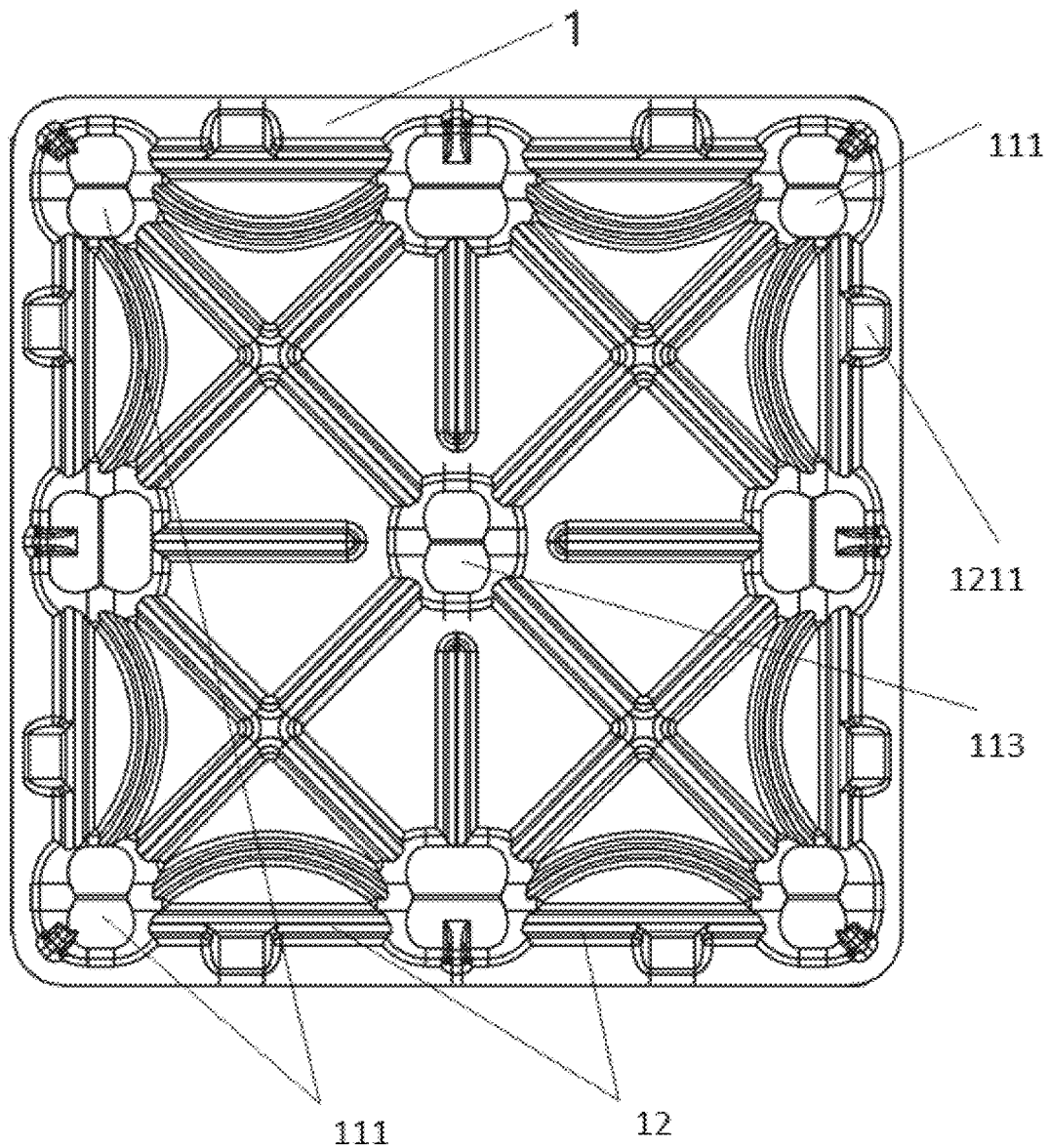
FIG. 22 is another pallet structure (pallet B) of the present invention in which a partition type reinforcing rib is not provided.

For the pallets with the partition type reinforcing rib (the pallet A in the test data) and the pallets without the partition type reinforcing rib (the pallet B in the test data, as shown in FIG. 22), different parts are selected for compression test.

The test part includes a middle portion of the pallet (abbreviated as part a in the test data), an edge stand (abbreviated as part b in the test data), and a corner stand (abbreviated as part c in the test data).

The test objects include 100 pallets A and 100 pallets B. Calculate the average value according to the test data of each pallet as the final test result.

The values of average carrying capacity are shown in the following table:

Compression Test 1:

| Critical static load of fracture or deformation (kg) | | | |
| --- | --- | --- | --- |
| Model | Part a | Part b | Part c |
| Pallet A | 6070 | 6105 | 6190 |
| Pallet B | 6075 | 4650 | 3540 |

Compression Test 2:

| Critical dynamic load of fracture or deformation (kg) | | | |
| --- | --- | --- | --- |
| Model | Part a | Part b | Part c |
| Pallet A | 4220 | 4120 | 4315 |
| Pallet B | 4210 | 3320 | 2980 |

As can be seen from the test data, in general, the pressure bearing capacity of the pallets A and B are excellent, which exceeds the ordinary molded pallets, but it is different in different parts and different for pallet A and pallet B. Regardless of dynamic or static conditions, the performance of the pallet A and pallet B is almost the same in the middle portion (part a), but the pressure bearing capacity at the position of the edge stand (part b) and the position of the corner stand (part c) is significantly different, which may be an order of magnitude. We found from the tests that, for the pallet B, the pallet before transformation, the part c is the part that has deformation first with the increase of the load. In some tests, the part c may be directly broken, and there are more than 80 pallets whose break and deformation parts occur in the connections of the arcuate reinforcing rib and stand opening. The bearing capacity of part b is slightly stronger than that of the part c, however, usually after the part c is deformed or broken, the part b will be deformed or broken immediately. The breakage and deformation of more than 70 pallets occur in the connections of the reinforcing rib and the inner wall of the stand. Thus, in the case that the strength is not high, the pallet B has exhibited an excellent bearing effect. However, the design of the pallet B in these two parts has some unreasonable points, after adjustment of the pallet A, the performance of this part has been improved, and all parts can show better carrying capacity.

As shown in FIGS. 13-20, the present invention provides a mold for preparing the equal-fork pallet, comprising an upper mold structure 2 and a lower mold structure 3. Under the action of the molding machine, the upper mold structure 2 and the lower mold structure 3 can be opened and closed to form the pallet.

The upper mold structure 2 comprises an upper mold base plate 21, an upper mold backing plate 22, an upper mold template 23, and an upper mold hot platen 24, the upper mold base plate 21 is used to connect with the molding machine and fix the entire upper mold structure 2 on the molding machine, the upper surface of the upper mold base plate 21 is connected to the mounting part of the molding machine (not indicated in the figure), and the lower surface of the upper mold base plate 21 is fixedly connected to the upper mold hot platen 24, and the upper mold hot platen 24 is provided with a plurality of mold heating tubes 4 uniformly distributed in the same direction, and the lower surface of the upper mold hot platen 24 is fixedly connected to the upper mold template 22, the upper mold template 22 and the upper mold hot platen 24 are provided with an upper mold backing plate 23, and the lower surface of the upper mold template 22 can be mounted with a stand mold core 25 in a plug-in way, the upper surface of the upper mold backing plate 23 is provided with a cooling liquid channel 231 that is arranged on the side of the upper mold hot platen 24. The height of the cooling liquid channel 231 can be flush with the height of the upper mold hot platen 24 because the cooling is primarily for the upper mold hot platen 24.

As shown in FIG. 2, a clamping convex block 251 is provided above the stand mold core 25, and a clamping part 232 connected to the stand mold core 25 is provided on the lower surface of the upper mold template 23, and the clamping part 232 protrudes from the lower surface of the upper mold template 22, moreover, the clamping part 232 has an outer surface (side) conforming to the shape of the inner wall of stand, the clamping part 232 becomes a part of the formation when molding, therefore, the side of the clamping part should have an appropriate shape. The middle portion of the clamping part 232 is provided with a recessed area 2321 matching the clamping convex block 251, and the stand mold core 25 is detachably mounted on the upper mold template 22 by the cooperation of the clamping convex block 251 and the recessed area 2321. And, after the stand mold core 25 is mounted, the outer surface thereof forms a continuous smooth surface with the outer surface of the clamping part 232, and the continuous smooth surface has a consistent shape with the inner surface of the stand sidewall corresponding to the stand mold core.

Figure 16:
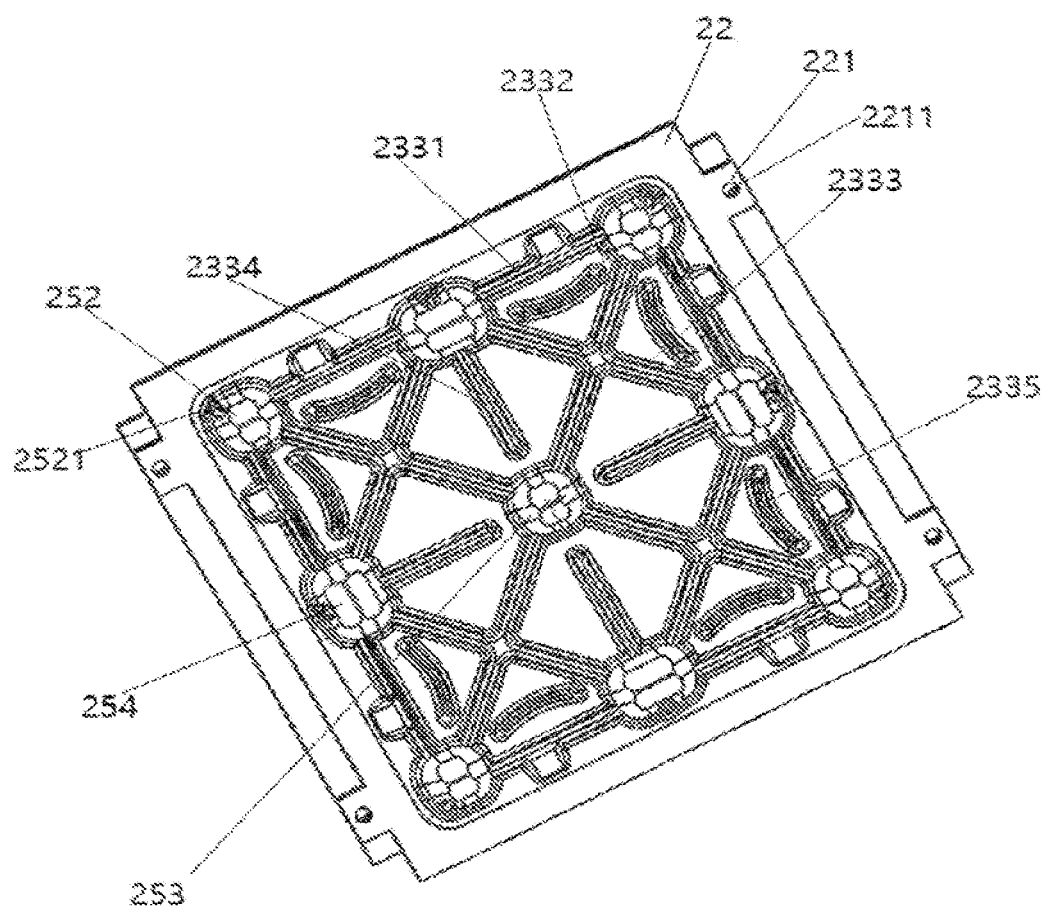
FIG. 16 is a bottom view of an upper mold structure of the present invention.

As shown in FIG. 16, the lower surface of the upper mold template 23 is provided with a reinforcing rib convex mold 233 for pressing the upper surface of the reinforcing rib in a portion other than the clamping part, and the reinforcing rib convex mold 233 comprises a clamping part that connects the corresponding edge stand, a transverse connection type reinforcing rib convex mold 2331 of the adjacent clamping part corresponding to the corner stand, a first oblique connection type reinforcing rib convex mold 2332 connecting the clamping part of corresponding corner stand and the clamping part of corresponding center stand, a second oblique connection type reinforcing rib convex mold 2333 connecting two adjacent clamping parts corresponding to the edge stand, and a semi-partition transverse reinforcing rib convex mold 2334 with one end connecting to the clamping part of corresponding edge stand and another end extending to the clamping part of corresponding center stand, and a partition arcuate reinforcing rib convex mold 2235.

The first oblique connection type reinforcing rib convex mold 2332 forms a large cross-shaped convex mold taking the clamping part of the corresponding center stand as a center, and the first oblique connection type reinforcing rib convex mold and second oblique connection type reinforcing rib convex mold cross to form a small cross-shaped convex mold, which forms a small triangle with the corresponding transverse connection type reinforcing rib convex mold 2331. The partition arcuate reinforcing rib convex mold 2335 is disposed in the small triangular area.

These reinforcing rib convex molds are used for forming the upper surface of the reinforcing rib on the pallet. The sections of protruding part of the reinforcing rib convex molds are all smooth arc surfaces, and the inner surface of the formed reinforcing rib is also a smooth arc surface, which can minimize the edge stress of the pallet and improve the bearing ability of the pallet. The arcuate reinforcing ribs adopt a partition method, which can enhance the bearing capacity of the pallet edge and avoid the formation of stress concentration area at the pallet stand position.

The upper mold backing plate 22 has connecting lugs 221 on both sides, and the connecting lugs 221 are symmetrically distributed on the edges on both sides of the upper mold backing plate 22. The connecting lug 221 is integrally formed with the upper mold backing plate 22, and the mounting lug 221 is provided with a mounting hole 2211. The upper mold base plate 21 and the upper mold backing plate 22 are detachably fixed by a connecting lug 221. In order to fix the connecting lug 221 conveniently, the outer edge on both sides of the upper mold base plate 21 with the same direction of connecting lug 221 is in flush with the outer edge of the connecting lug 221, the other two sides of the upper mold base plate 21 is located in the range of the upper mold backing plate 22, and the position at the both sides should cover the upper mold hot platen 25 and expose the cooling liquid channel 231 (at least part of the cooling liquid channel), so that the cooling liquid can be added from this part to the cooling liquid channel 231. If the upper mold base plate 21 is too large and it is unable to expose the cooling liquid channel 231 after installation, it may be unable to add cooling liquid or may cause interference with the position of the cooling liquid adding tube.

As shown in FIG. 16, the stand mold core 25 comprises four corner stand mold cores 252, a center stand mold core 253, and four edge stand mold cores 254, wherein the length of the edge stand mold core 254 along the side of the edge stand is greater than the length along the perpendicular direction. The edge stand mold core 254 has the same shape as the edge stand, and its cross section is integrally rectangular, and the four corners of the rectangle are rounded. The edge stand mold core 254 gradually tilts inwardly from top to bottom, the inclined surface is arc surface, moreover, at the part of the outer end of the edge stand mold core 254, the inclined surface is cut flat to form two V-shaped sections, and the outermost ends of the two sections are connected by a smooth arc surface. The connecting part of the arc surface corresponds to the bottom groove of the edge stand. The edge stand mold core has an edge protrusion matching the shape of the reinforcing rib on one side of the long side, and the edge protrusion extends downward to ½-⅔ of the height of the edge stand mold core, and the outer surface of the edge protrusion has edge bending and the bending position has an excessive arc surface, and the edge bending is located in the middle of the entire protrusion; the section of the corner stand mold core forms a square integrally, and four corners of this square are rounded. The corner stand mold core 252 gradually tilts inwardly from top to bottom, the inclined surface is arc surface, moreover, at the part of the outer end of the edge stand mold core, the inclined surface is cut flat to form two V-shaped sections, and the outermost ends of the two sections are connected by a smooth arc surface. The connecting part of the arc surface corresponds to the bottom groove of the corner stand. The corner stand mold core 252 has a corner protrusion 2521 matching the shape of the reinforcing rib 114 at one of the four corners and the corner protrusion 2521 extends downward to ½-⅔ of the height of the edge stand mold core 254, and the outer surface of the corner protrusion 2521 has corner bend 25211 and the position of corner bend 25211 has an excessive arc surface, and the corner bend 25211 is located in the middle of the entire corner protrusion 2521.

The upper mold hot platen 24 is provided with an upper mold heating channel 241, whose cross section is a quadrangle. The upper mold heating channel 241 has a section length of not less than the diameter of the mold heating tube 4, so that the mold heating tube 4 can rotate within the upper mold heating channel 241, making heat transfer more uniform, moreover, there is a certain gap between the upper mold heating channel 241 itself and the mold heating tube 4, which facilitates the replacement of the mold heating tube 4.

Figure 20:
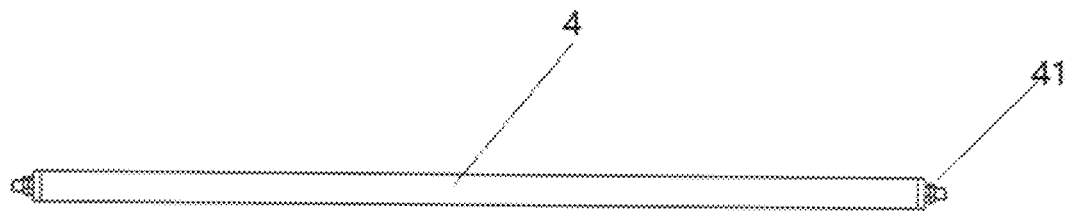
FIG. 20 is a schematic view of a mold heating tube.
Figure 21:
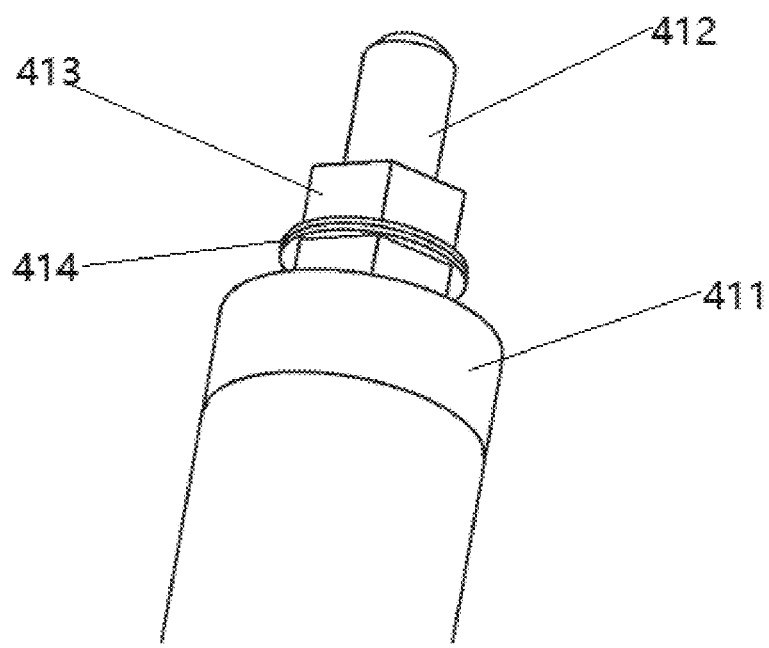
FIG. 21 is an enlarged view of the end of a mold heating tube.

As shown in FIGS. 20-21, a heating joint 41 is provided at both ends of the mold heating tube 4. The heating joint 41 comprises an insulating sleeve 411 directly sleeved on both ends of mold heating tube 4, and the insulting sleeve 411 is provided with an opening. The electrical connector 412 connected to the mold heating tube 4 fixedly is provided in the insulating sleeve 411. The electrical connector 412 is provided with a double nut structure, comprising two layers of inner and outer nuts 413. A double-layer gasket 414 is placed between the inner and outer layers of nuts 413, and there is screw threads of the remaining 413 of the electrical connector 412. Thus, the spacing between the inner and outer layers of nuts 413 can be adjusted by rotating the nuts, so that accessories such as wires can be held between the double-layer gaskets 414 to make the electrical connection more firmly.

Figure 17:
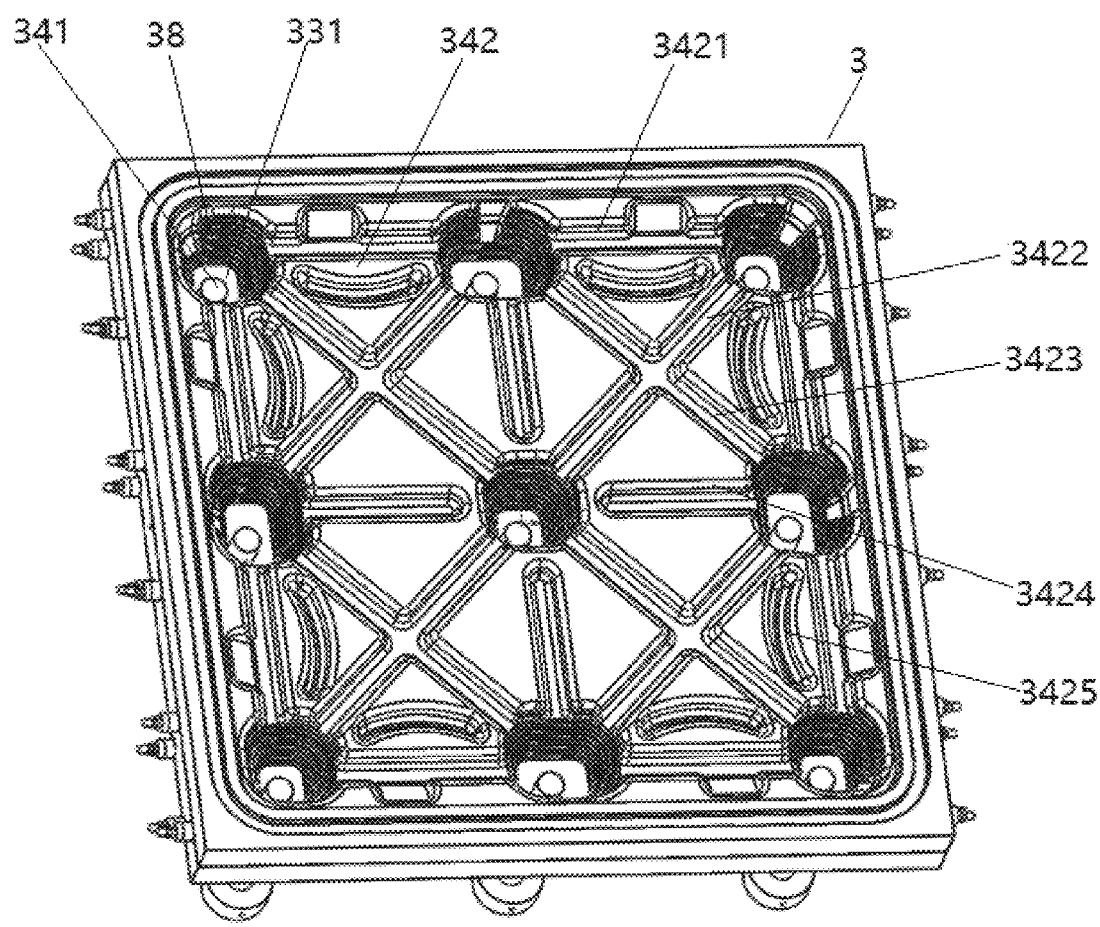
FIG. 17 is a schematic view of the lower mold structure of the present invention.

As shown in FIG. 17, the lower mold structure 3 comprises a lower mold base plate 31, a lower mold support rod 32, a lower mold hot platen 33, and a lower mold template 34, the upper end of the lower mold support rod 32 is fixedly connected to the lower surface of the lower mold base plate 31, and the lower end of the lower mold support rod 32 is provided with a connecting seat 321 that is used to connect with the molding machine and fix the entire lower mold structure on the molding machine, the lower mold support rod 32 and the connecting seat 321 can be integrally formed, the upper end of the lower mold support rod 32 can be fixed by plugging, snapping, or integrally formed with a lower mold base plate, a lower mold hot platen 33 is provided above the lower mold base plate 31, and a lower mold template 34 is provided above the lower mold hot platen 33.

Figure 18:
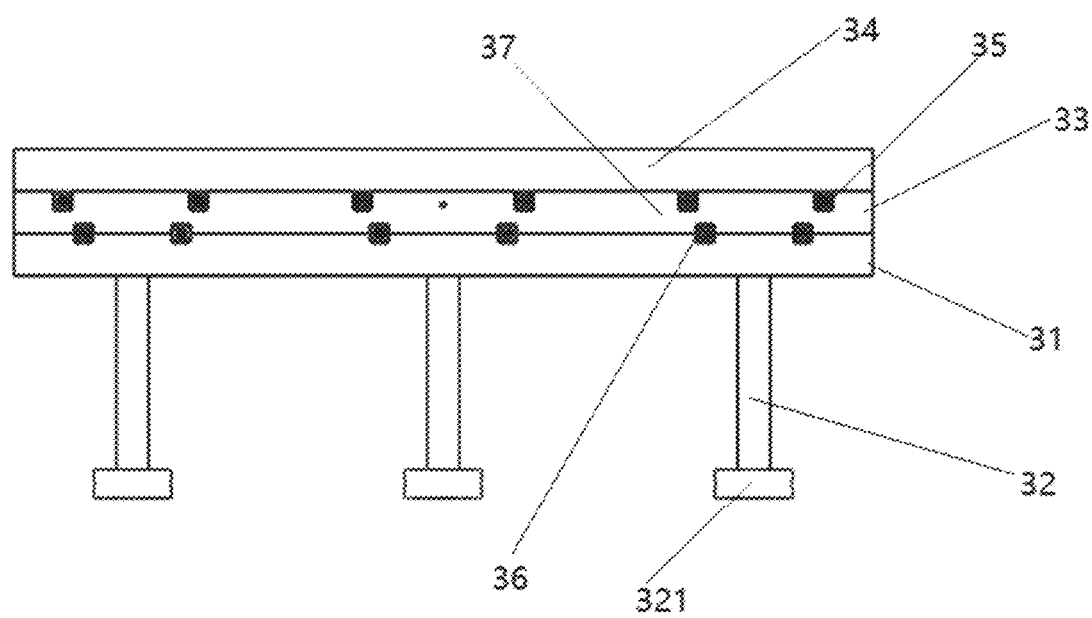
FIG. 18 is a side view of a lower mold structure of the present invention.
Figure 19:
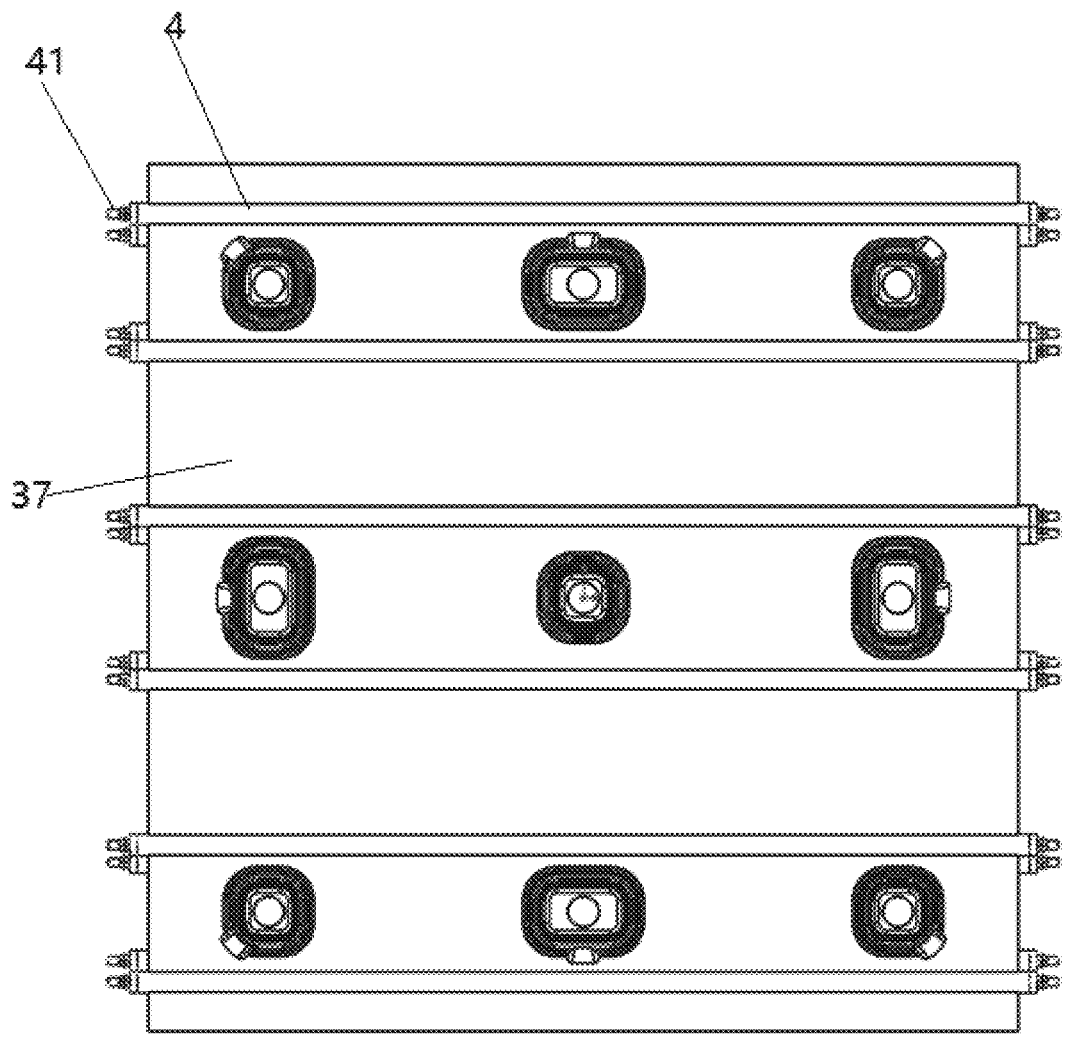
FIG. 19 is a top view of a lower mold structure of the present invention with a lower mold template omitted.

As shown in FIG. 18, a first lower mold heating channel 35 is provided between the lower mold hot platen 33 and lower mold template 34, and a second lower mold heating channel 36 is provided between the lower mold base plate 31 and the lower mold hot platen 33. The first lower mold heating channel 35 and the second lower mold heating channel 36 have the same direction, but they are staggered up and down, to form a heating channel group 37. As shown in the figure, each heating channel group 37 includes four heating channels, and two heating channels on the lower layer are located in two heating channels on the upper layer, that is, the connecting lines of each group of heating channel constitute an inverted trapezoid, by this way, a trapezoid will be formed between the adjacent heating channel groups. This arrangement staggers the heating channel up and down, and relatively speaking, it has a wide coverage and it is more uniform.

Like the upper mold structure, a mold heating tube 4 can be arranged in the first lower mold heating channel and the second lower mold heating channel of the lower mold structure. The model of the mold heating tube 4 can be the same model as the upper mold structure. The arrangement direction of the mold heating tube 4 is perpendicular to the arrangement direction of the mold heating tube 4 in the upper mold structure 2, and in some cases, the arrangement direction of the mold heating tube 4 in the lower mold structure is consistent with the arrangement direction of the mold heating tube 4 in the upper mold structure 2.

As shown in FIG. 18, the cross sections of the first and second lower mold heating channels are both quadrangle, and the side length of the quadrangle section is not less than the diameter of the mold heating tube, so that the mold heating tube can be rotated in the upper mold heating channel to make heat transfer more uniform, in addition, there is a certain gap between the heating channel itself and the mold heating tube, to facilitate the replacement of the mold heating tube. In some cases, the heating channel can be of the same cross-sectional shape as the mold heating tube.

As shown in FIGS. 20-21, heating joints 41 are provided on both ends of the mold heating tube 4. The heating joint 41 comprises an insulating sleeve 411 directly sleeved on both ends of mold heating tube 4, and the insulting sleeve is provided with an opening. An electrical connector 412 connected to the heating tube 4 fixedly is provided in the insulating sleeve 411. The electrical connector 412 is provided with a double nut structure, comprising two layers of inner and outer nuts 413. A double-layer gasket 414 is placed between the inner and outer layers of nuts 413. Thus, the spacing between the inner and outer layers of nuts 413 can be adjusted by rotating the nuts 413, so that accessories such as wires can be held between the double-layer gaskets 414 to make the electrical connection more firmly.

The lower mold template 34 is provided with a stand opening 341, and the stand opening 341 corresponds to each stand of the pallet. For example, there are nine stands in the pallet in the invention, so nine stand openings 341 are provided on the lower mold template 34. The stand mold core 25 can pass through these stand openings 341 and stick out of the lower mold template 34 when mold closing.

The shape of the stand opening 341 is the same as that of the stand. The inner wall of the stand opening 341 is provided with a step surface that is consistent with the shape and inclination of the outer surface of the stand sidewall. The stand mold core 25 corresponding to each stand passes through the corresponding stand opening 341, and the spacing between the stand mold core 25 and the stand opening 341 is consistent with the thickness of the stand sidewall 115.

The lower mold template 34 only corresponds to a part of the length of the stand sidewall 115, and the other part of the stand forming structure is located on the lower mold hot platen 33, that is, the lower mold hot platen 33 also has corresponding nine stand openings 331. As shown in the FIG. 19, and, on the inner wall of the stand opening 331 on the lower mold hot platen 33, a step surface that is consistent with the outer surface shape and the slope of the stand sidewall is further provided. A portion of the stand mold core 25 can be inserted into the stand openings 331 of the lower mold hot platen 33 during mold closing, and the spacing from the inner walls of the stand openings 331 is consistent with the thickness of the stand sidewall 115.

The size of the step surface gradually decreases from top to bottom in the stand opening 341 of the lower mold template 34, and the size of the step surface gradually decreases from top to bottom in the stand opening 331 of the lower mold hot platen 33, moreover, the gradual change of stand opening in the lower mold template 34 and lower mold hot platen 33 is continuous respectively and by connection. The "continuous respectively" means that the gradual change of stand opening in the lower mold template and lower mold hot platen respectively is continuous, and the "continuous by connection" means that the gradual change of the connection of the lower mold template and the lower mold hot platen is continuous. The so-called "continuous" means that the gradual change degree is consistent, for example, the degree of reduction of the upper stage and the lower stage is uniform, and if the separation is located on the same first grade step surface, the "continuous" means that the separation is continuous, without breaking.

At the bottom of the stand opening of the lower mold hot platen 33, there is a square or rectangular plane conforming to the shape of the bottom outer surface of the stand, and the four corners of this plane can be rounded. A reinforcing rib concave mold 38 with the same shape as the reinforcing rib on the pallet stand is provided in the stand opening 341 of the lower mold template 34 and the stand opening 331 of the corresponding lower mold hot platen 33.

In this embodiment, the portion above the corner 1143 corresponding to the reinforcing rib of the stand is formed in the lower mold template 34, and the portion below the corner 1143 corresponding to the stand reinforcing rib is formed in the lower mold heating plate 33.

The upper surface of the lower mold template 34 is provided with a reinforcing rib concave mold 342 for pressing the lower surface of the reinforcing rib, and the reinforcing rib concave mold 342 comprises a transverse connection type reinforcing rib concave mold 3421 connecting the stand opening of edge stand and the stand opening of the corresponding adjacent corner stand, a first oblique connection type reinforcing rib concave mold 3422 respectively connecting stand opening of each corresponding corner stand and the stand opening of corresponding center stand, a second oblique connection type reinforcing rib concave mold 3423 connecting the stand openings of two adjacent edge stands, a semi-partition transverse reinforcing rib concave mold 3424 whose one end is connected to the stand opening of corresponding edge stand and the other end extends to the stand opening of corresponding center stand, and a partition arcuate reinforcing rib concave mold 3425.

The first oblique connection type reinforcing rib convex mold 3422 forms a large cross-shaped convex mold taking the clamping part of the corresponding center stand as a center, and the first oblique connection type reinforcing rib convex mold 3422 and second oblique connection type reinforcing rib convex mold 3423 cross to form a small cross-shaped convex mold, which forms a small triangle with the corresponding transverse connection type reinforcing rib convex mold 3421. The partition arcuate reinforcing rib convex mold 3425 is disposed in the small triangular area.

These reinforcing rib convex molds are used for forming the upper surface of the reinforcing rib on the pallet. The sections of protruding part of the reinforcing rib convex molds are all smooth arc surfaces, and the inner surface of the formed reinforcing rib is also a smooth arc surface, which can minimize the edge stress of the pallet and improve the bearing ability of the pallet. The arcuate reinforcing ribs adopt a partition method, which can enhance the bearing capacity of the pallet edge and avoid the formation of stress concentration area at the pallet stand position.

The reinforcing rib concave mold on the lower mold template corresponds to the reinforcing rib convex mold on the upper mold template, and the spacing between them is the same as the thickness of the template when closing mold.

In some preferred embodiments, the thickness of the lower mold template is mainly considered to be able to accommodate the lower surface of the reinforcing rib. Therefore, the thickness of the lower mold template needs to exceed the depth of the reinforcing rib, but in order to meet certain strength requirement, in general, the thickness of the lower mold template is twice as the depth of the reinforcing rib, here, the depth of the reinforcing rib is the vertical distance from the upper surface of the formed pallet to the lower surface of the reinforcing rib.

What is claimed is:

1. A square equal-fork pallet, comprising:
a pallet body having a surface with four corners, with four edges of equal length and one center, wherein the pallet body is provided with a stand structure and a reinforcing structure, the reinforcing structure comprises one or more sets of reinforcing ribs that are groove structures supressed on the surface of the pallet body;
the stand structure comprises four corner stands, fours edge stands and one center stand,
each of the four corner stands being disposed at each of the four corners of the pallet body,
each of the four edge stands being disposed at a middle of each of the four edges of the pallet body, the one center stand being disposed at the center of the pallet body, the four corner stands, the four edge stands and the one center stand having the same height, so that bottoms of all stand of the pallet are on the same plane when the pallet is laid flatwise, the distance between each edge stand and the adjacent corner stands being the same; and
wherein each of the one or more sets of reinforcing ribs comprises one or more connection reinforcing ribs, one or more semi-partition reinforcing ribs and one or more arcuate partition reinforcing ribs, each reinforcing rib having two ends; and
wherein neither of the two ends of the arcuate partition reinforcing rib is connected to one of the four corner stands, one of the fours edge stands or the center stand, and
wherein each of the arcuate partition reinforcing ribs is located in a closed triangular area formed by two connection reinforcing ribs located between the edge stands and the corner stands on the side of the pallet, and wherein the closed triangular area is located near to the edge of the pallet body.

2. The equal-fork pallet according to claim 1, wherein a notch is provided on at least one of the connection reinforcing ribs.

3. The equal-fork pallet according to claim 1, wherein both ends of each of the connection reinforcing ribs are connected either to one of the corner stands and the center stand; or to one of the corner stands and to an adjacent edge stand.

4. The equal-fork pallet according to claim 1, wherein each semi-partition reinforcing rib is disposed between an adjacent edge stand and the center stand, and wherein one end of each semi-partition reinforcing rib is connected to the adjacent edge stand, and the other end of the respective semi-partition reinforcing rib extends toward the center stand and is not connected to the center stand.

5. The equal-fork pallet according to claim 1, wherein one of the connection reinforcing ribs is disposed between each edge stand and an adjacent corner stand to interconnect the four edges of the pallet, and wherein the semi-partition reinforcing ribs divide the pallet body into four squares.

6. The equal-fork pallet according to claim 1, wherein each of the center stand and the corner stands has a bottom plate, and wherein the bottom plate is quadrangle.

7. An equal-fork pallet mold for preparing the equal-fork pallet according to claim 1, comprising an upper mold structure and a lower mold structure, and the upper mold structure and the lower mold structure are opened and closed by a molding machine to press and form a pallet;

the upper mold structure comprises an upper mold base plate, an upper mold backing plate, an upper mold template, and an upper mold hot platen, the upper mold base plate is used to connect with the molding machine and fix the entire upper mold structure on the molding machine, the upper surface of the upper mold base plate is connected to the mounting part of the molding machine, and the lower surface of the upper mold base plate is fixedly connected to the upper mold hot platen, and the upper mold hot platen is provided with a plurality of mold heating tubes uniformly distributed in the same direction, and the lower surface of the upper mold hot platen is fixedly connected to the upper mold template, the upper mold template and the upper mold hot platen are provided with an upper mold backing plate, and the lower surface of the upper mold template can be mounted with a stand mold core in a plug-in way, the upper surface of the upper mold backing plate is provided with a cooling liquid channel that is arranged on the side of the upper mold hot platen;

the lower mold structure comprises a lower mold base plate, a lower mold support rod, a lower mold hot platen, and a lower mold template, the upper end of the lower mold support rod is fixedly connected to the lower surface of the lower mold base plate, and the lower end of the lower mold support rod is provided with a connecting seat that is used to connect with the molding machine and fix the entire lower mold structure on the molding machine, the lower mold support rod and the connecting seat can be integrally formed, the upper end of the lower mold support rod can be fixed by plugging, snapping, or integrally formed with a lower mold base plate, a lower mold hot platen is provided above the lower mold base plate, and a lower mold template is provided above the lower mold hot platen.

\* \* \* \* \*